United States Patent
Takano

(10) Patent No.: US 9,450,740 B2
(45) Date of Patent: Sep. 20, 2016

(54) COMMUNICATION DEVICE TO ARRANGE AN EXTENSION CONTROL AREA IN A SUBFRAME ACCORDING TO A PERIODIC MAPPING PATTERN

(75) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 14/123,573

(22) PCT Filed: Aug. 23, 2012

(86) PCT No.: PCT/JP2012/005290
§ 371 (c)(1),
(2), (4) Date: Dec. 3, 2013

(87) PCT Pub. No.: WO2013/031152
PCT Pub. Date: Mar. 7, 2013

(65) Prior Publication Data
US 2014/0092859 A1    Apr. 3, 2014

(30) Foreign Application Priority Data

Sep. 1, 2011  (JP) .................. 2011-190521

(51) Int. Cl.
*H04L 5/00* (2006.01)
*H04W 72/12* (2009.01)

(52) U.S. Cl.
CPC ........... *H04L 5/0092* (2013.01); *H04L 5/0053* (2013.01); *H04L 5/0082* (2013.01); *H04W 72/1289* (2013.01); *H04L 5/0023* (2013.01); *H04L 5/0035* (2013.01)

(58) Field of Classification Search
None
See application file for complete search history.

(56) References Cited

U.S. PATENT DOCUMENTS

| | | | |
|---|---|---|---|
| 6,996,124 B1* | 2/2006 | Chow | 370/466 |
| 7,079,568 B1* | 7/2006 | Boetzel et al. | 375/132 |
| 8,537,862 B2* | 9/2013 | Blankenship et al. | 370/483 |
| 8,805,303 B2* | 8/2014 | Koo et al. | 455/114.2 |
| 2007/0260851 A1* | 11/2007 | Taha et al. | 712/204 |
| 2008/0107035 A1* | 5/2008 | Zhu et al. | 370/241 |
| 2008/0132230 A1* | 6/2008 | Marinier et al. | 455/434 |
| 2010/0061398 A1* | 3/2010 | Stadelmeier et al. | 370/465 |
| 2010/0165847 A1* | 7/2010 | Kamuf et al. | 370/241 |
| 2010/0215011 A1* | 8/2010 | Pan et al. | 370/329 |
| 2010/0317343 A1* | 12/2010 | Krishnamurthy et al. | 455/435.1 |
| 2011/0021215 A1* | 1/2011 | Iwamura et al. | 455/458 |

(Continued)

FOREIGN PATENT DOCUMENTS

| | | |
|---|---|---|
| EP | 2 302 830 A2 | 3/2011 |
| JP | 2011-71706 A | 4/2011 |

(Continued)

OTHER PUBLICATIONS

Extended European Search Report issued on Dec. 19, 2014 in Application No. 12828497.3.

(Continued)

*Primary Examiner* — Hassan Kizou
*Assistant Examiner* — Tejis Daya
(74) *Attorney, Agent, or Firm* — Oblon, McClelland, Maier & Neustadt, L.L.P.

(57) ABSTRACT

A communication device, method, and system generate wireless communication signals that include a subframe within a radio frame. The subframe includes an extension control area in a data area of the subframe. The extension control area is set according to a periodic mapping pattern.

19 Claims, 24 Drawing Sheets

(56) References Cited

U.S. PATENT DOCUMENTS

| | | | |
|---|---|---|---|
| 2011/0075624 A1 | 3/2011 | Papasakellariou et al. | |
| 2011/0090854 A1* | 4/2011 | Montojo et al. | 370/329 |
| 2011/0190019 A1* | 8/2011 | Woo et al. | 455/515 |
| 2011/0243047 A1* | 10/2011 | Dayal et al. | 370/311 |
| 2011/0274066 A1* | 11/2011 | Tee et al. | 370/329 |
| 2012/0057563 A1* | 3/2012 | Kiyoshima et al. | 370/330 |
| 2012/0163305 A1* | 6/2012 | Nimbalker et al. | 370/329 |
| 2012/0294248 A1* | 11/2012 | Seo et al. | 370/329 |
| 2014/0036828 A1 | 2/2014 | Papasakellariou et al. | |

FOREIGN PATENT DOCUMENTS

| | | | |
|---|---|---|---|
| WO | WO 2008/155910 A | | 12/2008 |
| WO | WO2010110283 | * | 9/2010 |
| WO | 2011/017912 A1 | | 2/2011 |
| WO | WO2011074868 | * | 6/2011 |
| WO | WO 2011/085192 A1 | | 7/2011 |

OTHER PUBLICATIONS

International Search Report issued Nov. 13, 2012 in PCT/JP2012/005290.

International Search Report and Written Opinion issued Nov. 13, 2012 in PCT/JP2012/005290.

"Discussion on ePDCCH Design Issues", 3GPP TSG-RAN1 #66 meeting R1-112517, Aug. 22, 2011, pp. 1-4.

Office Action issued Dec. 8, 2015 in Japanese Patent Application No. 2011-190521.

"PDCCH enhancement in Rel-11 carrier aggregation" Huawei, HiSilicon, 3GPP TSG RAN WG1 Meeting #66 R1-112461, Aug. 22-26, 2011, pp. 1-2.

"Views on carrier aggregation enhancement for Rel-11" NTT Docomo, 3GPP TSG RAN WG1 Meeting #66 R1-112427, Aug. 22-26, 2011, pp. 1-3.

Office Action mailed Jul. 5, 2016 in Japanese Patent Application No. 2011-1 90521 (with English Translation).

* cited by examiner

COMMUNICATION DEVICE TO ARRANGE AN EXTENSION CONTROL AREA IN A SUBFRAME ACCORDING TO A PERIODIC MAPPING PATTERN

TECHNICAL FIELD

The present disclosure relates to a communication device, a communication method, a communication system, and a base station.

BACKGROUND ART

Currently, in the Third Generation Partnership Project (3GPP), standardization of a 4G wireless communication system (LTE-Advanced) of a next generation type is in progress. In the 4G, it is under consideration to introduce techniques such as multi user-MIMO (MU-MIMO) and coordinated multi points transmission (CoMP) in order to improve a maximum communication rate and the quality at a cell edge.

In the LTE, a radio frame of 10 ms and 10 sub frames configuring the radio frame of 10 ms are defined. Each sub frame includes a control area used to transmit a control signal (PDCCH) and a data area used to transmit user data (PDSCH). For example, Patent Document 1 discloses this frame structure.

Meanwhile, in the 3GPP, machine type communications (MTC) have been discussed. Generally, the MTC has the same meaning as machine to machine (M2M) and refers to communication between machines, which is not used directly by human. Usually, the MTC is performed between a server and an MTC terminal which is not used directly by human. In the MTC, communication may be performed at a long period such as one week or one month.

CITATION LIST

Patent Literature

PTL 1: Patent Document 1: Japanese Patent Application Laid-Open No. 2011-071706

SUMMARY

Technical Problem

However, new techniques such as MU-MIMO or CoMP whose introduction to the 4G has been discussed can be implemented using an additional control signal. Further, as the spread of the MTC increases, the number of user equipment (UE) (including an MTC terminal) increases, leading to an increase in the number of control signals to be used.

In this regard, the present disclosure proposes a communication device, a communication method, a communication system, and a base station, which are novel and improved and which are capable of appropriately extending the control area to the inside of the data area.

Solution to Problem

A communication device having, a signal generation device that generates a wireless communications signal that includes a subframe within a radio frame, wherein the subframe includes an extension control area in a data area of said subframe, and the extension control area is set according to a periodic mapping pattern.

A communication device including, a receiver that receives and detects an extension control area in a data area of a subframe of a radio frame transmitted from a base station, wherein the extension control area including a control signal and is set according to a periodic mapping pattern.

A communication method including, setting with a processing circuit an extension control area in a data area of a subframe, the setting including setting the extension control area according to a periodic mapping pattern; and transmitting the subframe within a radio frame of a wireless communications signal.

A communication system including, a base station including a signal generation device that generates a wireless communications signal that includes a subframe within a radio frame, wherein the subframe includes an extension control area in a data area of said subframe and the extension control area is set according to a periodic mapping pattern; and a communication device having a receiver that receives and detects the extension control area set in the data area of the subframe transmitted from the base station.

A communication method including, receiving with a receiver a wireless signal transmitted from a base station, the wireless signal including an extension control area set in a data area of a subframe of a radio frame of the wireless signal, wherein said extension control area includes a control signal.

Advantageous Effects of Invention

As described above, according to the present disclosure, the control area can be appropriately extended to the inside of the data area.

DESCRIPTION OF EMBODIMENTS

Figure 1:
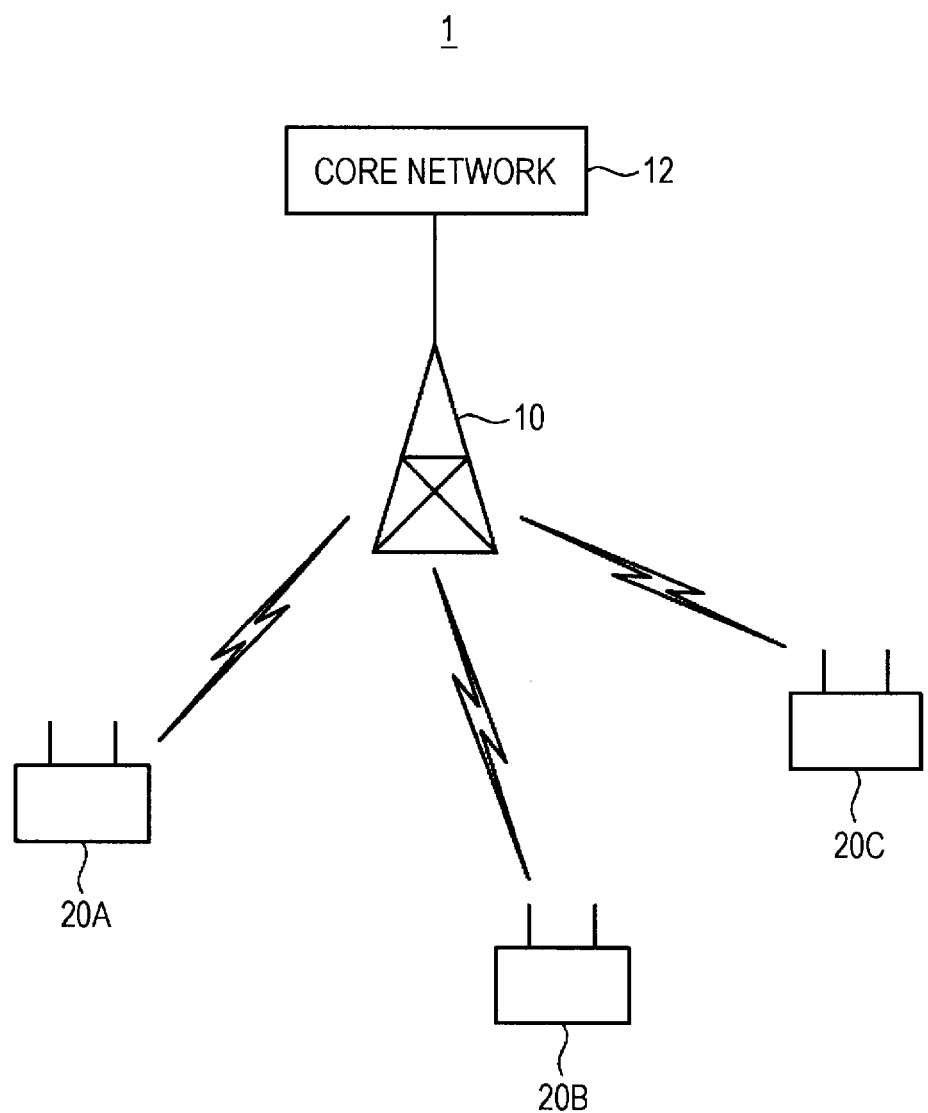
FIG. 1 is an explanatory diagram illustrating a configuration of a communication system according to an embodiment of the present disclosure.

Hereinafter, exemplary embodiments of the present disclosure will be described in detail with reference to the accompanying drawings. In this disclosure and drawings, components having substantially the same functional configuration are denoted by the same reference numerals, and the redundant description will not be repeated.

Further, in this disclosure and drawings, a plurality of components having substantially the same functional configuration are denoted by the same reference numerals, and then different alphabets may be attached to the reference numerals for a distinction. For example, a plurality of components having substantially the same functional configuration may be distinct from each other in the form of UEs 20A, 20B, and 20C as necessary. However, when a plurality of components having substantially the same functional configuration need not be distinct from each other, they are denoted by the same reference numerals. For example, when UEs 20A, 20B and 20C need not be particularly distinct from each other, they are referred to simply as UE 20.

The present disclosure will be described below in the following section order.

1. Outline of Wireless Communication System
  1-1. Configuration of Wireless Communication System
  1-2. Frame Structure
  1-3. System Frame Number (SFN)
  1-4. Background
2. First Embodiment
  2-1. Configuration of Base Station According to First embodiment
  2-2. Configuration of UE According to First embodiment
  2-3. Operation According to First Embodiment
3. Second Embodiment
  3-1. Configuration of Base Station According to Second embodiment
  3-2. Modified Embodiment of Second Embodiment
4. Third Embodiment
  4-1. Configuration of UE According to Third embodiment
  4-2. Operation According to Third Embodiment
  4-3. Modified Embodiment
5. Conclusion 1. Outline of Wireless Communication System A technology according to the present disclosure can be embodied in various forms as will be described in detail in "2. First Embodiment" to "4. Third Embodiment" as examples. First, an outline of a wireless communication system which is common to embodiments will be described below.

<1-1. Configuration of Wireless Communication System>

FIG. 1 is an explanatory diagram illustrating a configuration of a communication system 1 according to an embodiment of the present disclosure. As illustrating in FIG. 1, the communication system 1 according to an embodiment of the present disclosure includes a base station 10, a core network 12, and user equipments (UEs) 20A to 20C.

The UE 20 is a communication device that performs a reception process in a downlink resource block assigned by the base station 10 and performs a transmission process in an uplink resource block.

For example, the UE 20 may be an information processing apparatus such as a smart phone, a personal computer (PC), a home video processing apparatus (a digital versatile disc (DVD) recorder, a video cassette recorder (VCR), or the like), a personal digital assistant (PDA), a home game machine, or a home appliance. Further, the UE 20 may be a mobile communication device such as a portable telephone, a personal handy phone system (PHS), a portable music player, a portable video processing apparatus, or a portable game machine.

In addition, the UE 20 may be an MTC terminal. The MTC terminal is a wireless terminal which has been discussed in the 3GPP and which is specialized in MTC which is communication between machines and is not used directly by human. For example, as a medical MTC application, an MTC terminal may collect electrocardiogram information of human and then transmit the electrocardiogram information via an uplink channel when a certain trigger condition is satisfied. As another MTC application, an automatic vending machine may function as an MTC terminal, and the MTC terminal may transmit information about stock or sales of the automatic vending machine via an uplink channel.

For example, the MTC terminal generally has the following features. However, each MTC terminal needs not necessarily have all of the following features, and a feature included in each MTC terminal is decided depending on an application.

There is little moving (Low Mobility)
  Small amount of data transmission (Online Small Data Transmission)
  Extra-Low Power Consumption
  MTC are grouped and handled (Group-based MTC Features)

Further, when the MTC terminals concurrently transmit transmission and reception requests to the base station 10, the base station 10 or the core network 12 may undergo congestion. Further, in order to promote the widespread use of the MTC terminal, it is desirable not only to lower the cost but also to cause the MTC terminal to coexist with a portable telephone terminal. Thus, a possibility that a cellular network of only MTC terminals will be constructed is low.

The base station 10 is a radio base station that communicates with the UE 20 located in the coverage. The base station 10 may be an eNodeB, a relay node, a femto cell base station, a remote radio head (RRH), or a pico eNodeB. FIG. 1 illustrates an example in which only one base station 10 is connected to the core network 12, but many base stations 10 are actually connected to the core network 12.

The core network 12 is a service provider side network including a management node such as a mobility management entity (MME) or a serving gateway (GW). The MME is an apparatus that sets and opens a data communication session, and controls a handover. The MME is connected to the eNodeB 10 through an interface called X2. The S-GW is an apparatus that perform routing and transmission of user data or the like.

<1-2. Frame Structure>

Next, a structure of a frame shared between the base station 10 and the UE 20 will be described.

Figure 2:
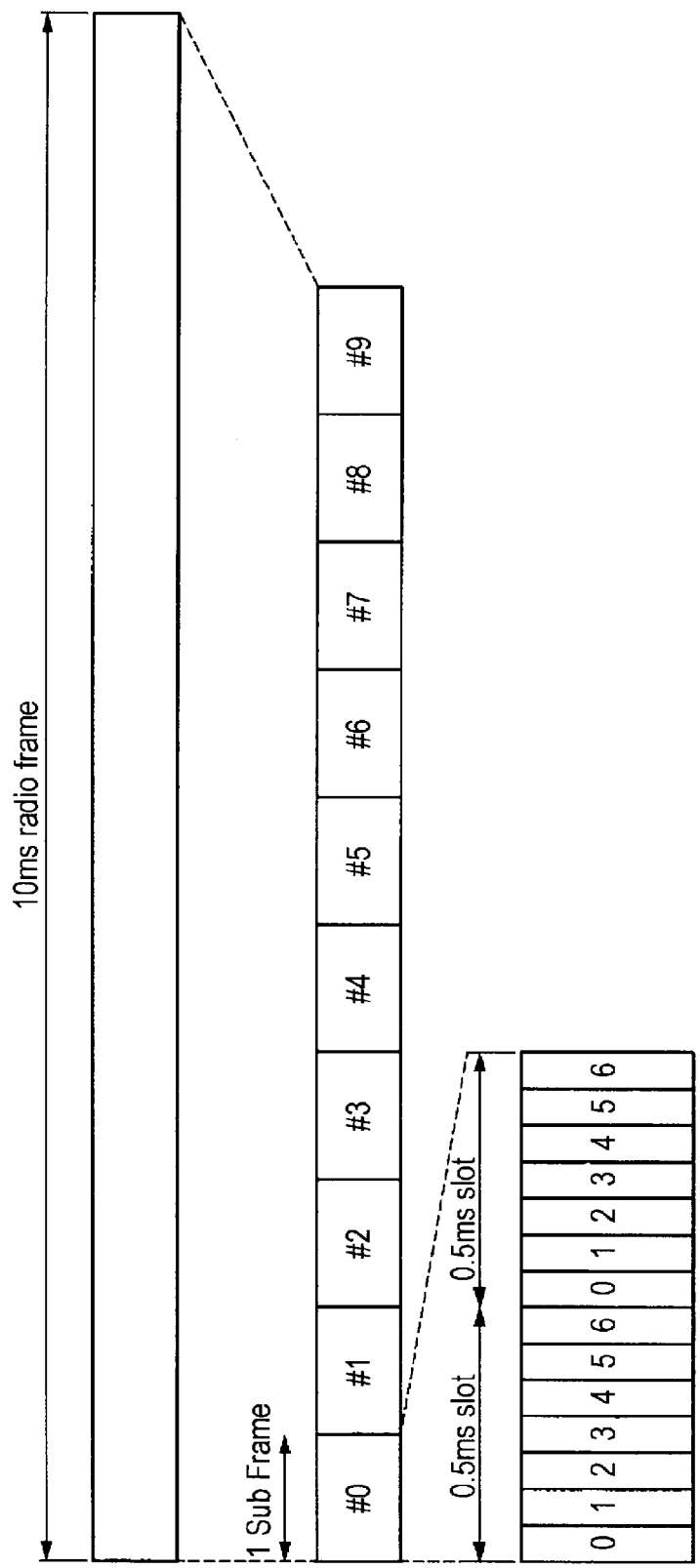
FIG. 2 is an explanatory diagram illustrating a frame format.

FIG. 2 is an explanatory diagram illustrating a frame format. As illustrated in FIG. 2, a radio frame of 10 ms includes 10 sub frames #0 to #9 each having a length of 1 ms. Each sub frame refers to a resource block including 12 sub carriers×14 orthogonal frequency division multiplexing (OFDM) symbols, and assignment of scheduling is performed in units of resource blocks. Further, 1 OFDM symbols function not only as a unit used in a communication scheme of an OFDM modulation scheme but also a unit in which data processed by single fast Fourier transform (FFT) is output.

Figure 3A:
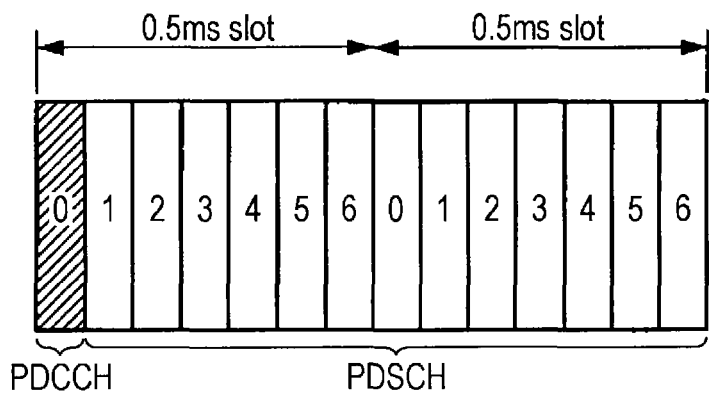
FIG. 3A is an explanatory diagram illustrating a configuration example of a sub frame.
Figure 3B:
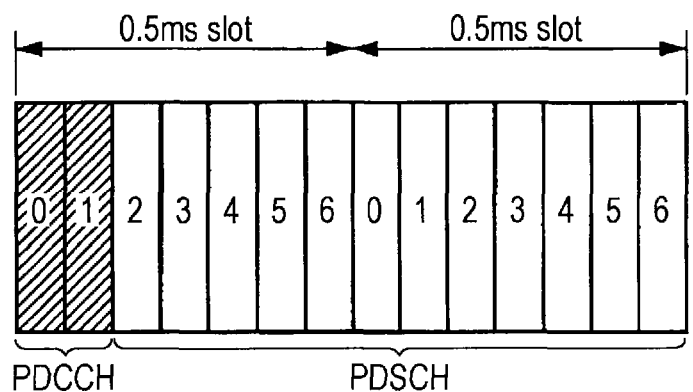
FIG. 3B is an explanatory diagram illustrating a configuration example of a sub frame.
Figure 3C:
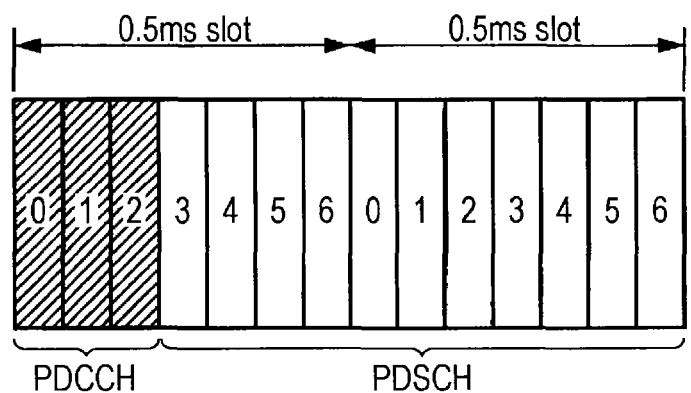
FIG. 3C is an explanatory diagram illustrating a configuration example of a sub frame.

Each sub frame is a unit frame including a control area and a data area. As illustrated in FIGS. 3A to 3C, the control area includes 1 to 3 OFDM symbols at the head of each sub frame and is used to transmit a control signal called a phy downlink control channel (PDCCH). The number of OFDM symbols used for the control area mainly depends on the number of the UEs 20. The data area following the control area is used to transmit, for example, user data called a phy downlink shared channel (PDSCH).

(Configuration of PDCCH)

The PDCCH includes downlink scheduling information (downlink assignment) and uplink scheduling information (uplink grants). The downlink scheduling information represents the position of a resource block to be received by the UE 20, and the uplink scheduling information represents the position of a resource block which is to be transmitted by the UE 20. The base station 10 assigns the downlink scheduling information and the uplink scheduling information to the UE 20 in light of a transmission line situation or the like.

Typically, the downlink scheduling information represents an assignment of a resource block in a sub frame in which a PDCCH including corresponding downlink scheduling information is arranged. Meanwhile, when the UE 20 receives the uplink scheduling information and then starts transmission, a delay time for preparation is necessary. Thus, the uplink scheduling information typically represents an assignment of a resource block after 4 sub frames from a sub frame in which a PDCCH including corresponding uplink scheduling information is arranged.

The downlink scheduling information and the uplink scheduling information are main control signals included in the PDCCH, but the PDCCH also include other control signals such as ACK/NACK information and uplink power control information.

<1-3. System Frame Number (SFN)>

The structure of the radio frame has been described above with reference to FIGS. 2 and 3. A serial number of 0 to 1023 called a system frame number (SFN) is set to each radio frame. The SFN deeply relates to an embodiment of the present disclosure, and thus the SFN will be concretely described below.

The base station 10 broadcasts system information through a phy broadcast channel (PBCH). The system information mainly includes master information block (MIB) and system information block (SIB). Of these, information for specifying the SFN is included in the MIB.

The SFN of 0 to 1023 is represented by 10 bits, but an SFN of 8 bits (hereinafter, referred to as a "rough SFN") for specifying the SFN of 10 bits is included in an MIB. For this reason, the UE 20 can acquire an accurate SFN by interpolating the rough SFN using an internal counter. This point will be described below in further detail with reference to FIG. 4.

Figure 4:
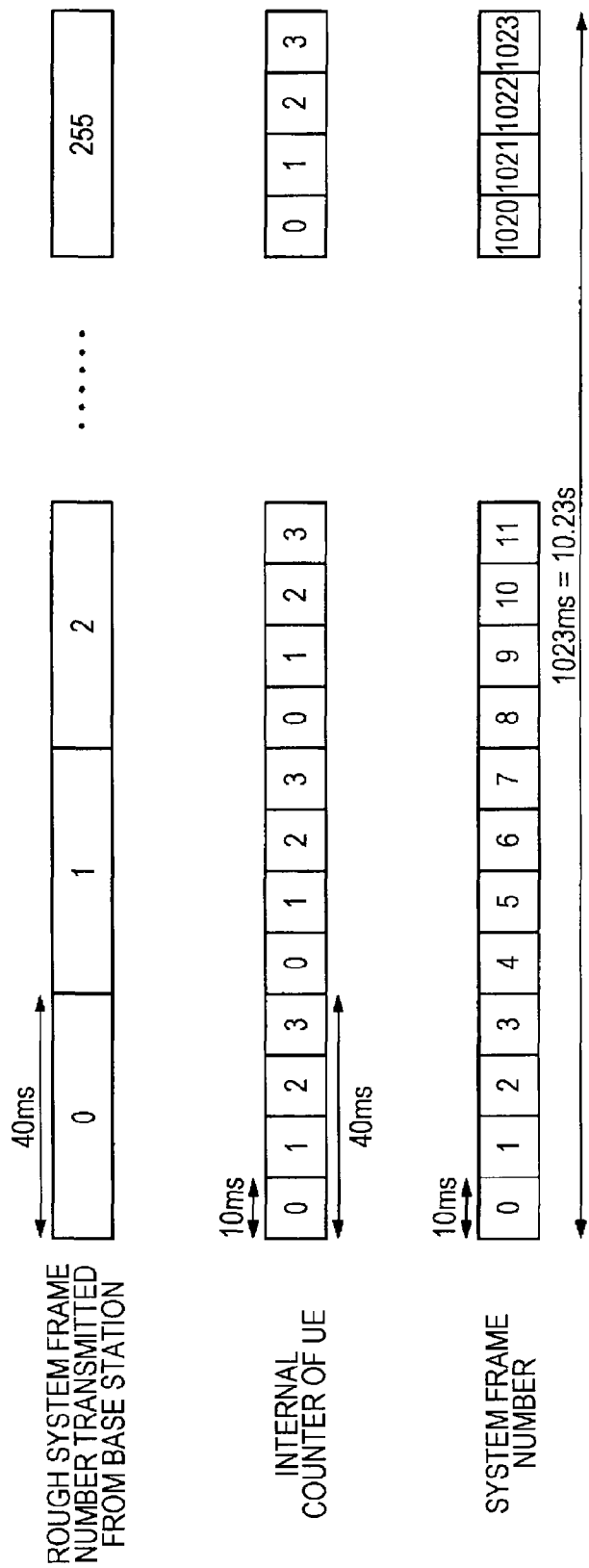
FIG. 4 is an explanatory diagram illustrating a method of sharing an SFN in user equipment (UE).

FIG. 4 is an explanatory diagram illustrating a method of sharing an SFN in the UE 20. As illustrated in FIG. 4, the base station 10 increments a rough SFN of 8 bits representing a value of 0 to 255 to a sum length of a specified number of radio frames, for example, 40 ms corresponding to a sum length of 4 radio frames once. Thus, the update frequency of the MIB can be reduced compared to when the SFN of 10 bits is notified from the base station 10 side.

Meanwhile, the UE 20 may specify an SFN of 10 bits by counting a lapse of 10 ms for a time period of the same rough SFN and then interpolating 2 bits. For example, the UE 20 can specify SFNs "4" to "7" by counting "0" to "3" at a period of 10 ms when the rough SFN is "1".

<1-4. Background>

The outline of the communication system 1 according to an embodiment of the present disclosure has been described above. Next, the background of embodiments of the present disclosure will be described before a detailed description of embodiments of the present disclosure.

The background of the present disclosure includes the spread of an MTC terminal or an introduction of new techniques such as the MU-MIMO and the CoMP. As described in "1-1. Configuration of Wireless Communication System", the MTC terminal can be disposed in equipment that does not involve human unlike a typical portable telephone terminal. For this reason, more MTC terminals than portable telephone terminals are expected to be on the market in the future. As a result, the anxiety about exhaustion of a control area to transmit a PDCCH is rising.

Similarly, as new techniques such as the MU-MIMO and the CoMP are introduced, control signals to implement the MU-MIMO and the CoMP increase, and the anxiety about shortage of a control area is rising.

On this point, a method of simply increasing a control area to 4 OFDM symbols or 5 OFDM symbols may be considered, but in this case, there occurs a problem in that the throughput is lowered since a data area to transmit a PDSCH is reduced.

Figure 5:
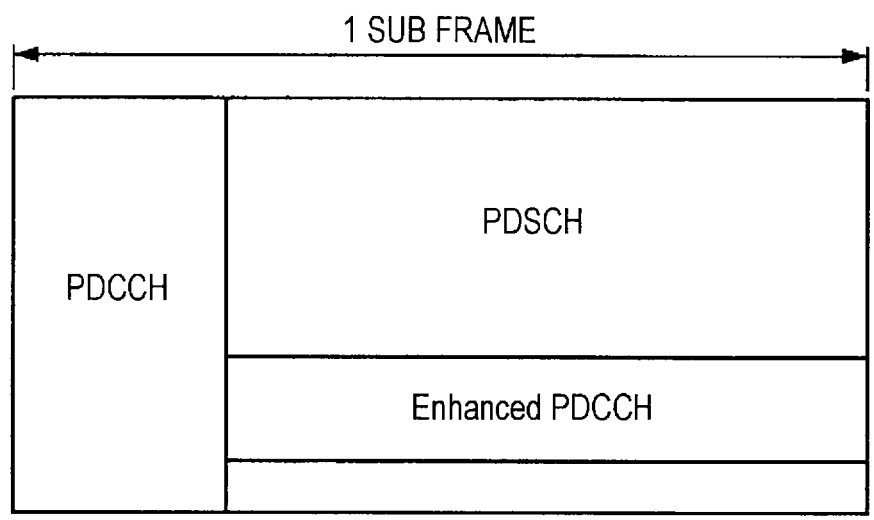
FIG. 5 is an explanatory diagram illustrating an extension example of a PDCCH.

Further, a method of disposing an extension area (enhanced PDCCH) of a PDCCH in a data area of each sub frame may be considered as illustrated in FIG. 5, but there similarly occurs a problem in that the throughput is lowered.

In this regard, embodiments of the present disclosure are made in light of the foregoing. According to an embodiment of the present disclosure, the control area can be appropriately extended to the inside of the data area. Hereinafter, techniques of the present disclosure including this embodiment will be described in detail.

The following embodiments propose a unit to solve resource shortage of a PDCCH, but since information related to paging is also included in a PDCCH, the embodiments of the present disclosure can be applied to paging. In other words, in a radio resource control (RRC)_Idle mode, the UE 20 intermittently receives paging information of a PDCCH (DRX: discontinues reception). Further, in an RRC_Connected mode, the UE 20 receives a PDCCH at a DRX period for power saving. Thus, the technique related to the PDCCH of the present disclosure can be applied not only to the UE 20 in the RRC_Idle mode but also to the UE 20 in the RRC_Connected mode. The RRC_Idle mode refers to a state in which power of the UE 20 is saved, and the UE 20 in the RRC_Idle mode monitors a paging channel from an eNodeB and transitions to the RRC_Connected mode when a call is included in the paging channel. The RRC_Connected mode refers to a state in which a connection is established between the UE 20 and the base station 10 and the UE 20 transmits an uplink signal and receives a downlink signal.

2. First Embodiment

<2-1. Configuration of Base Station According to First Embodiment>

Figure 6:
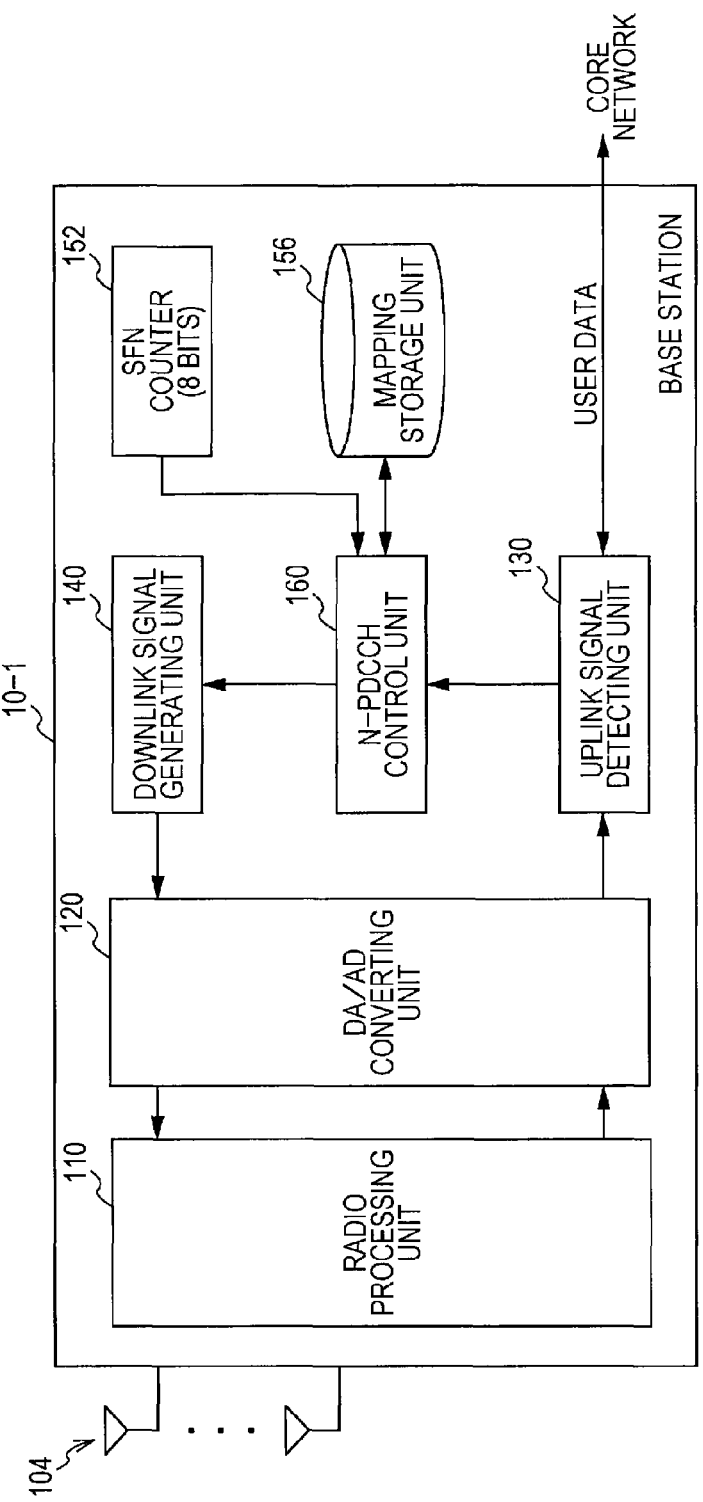
FIG. 6 is a functional block diagram illustrating a configuration of a base station according to a first embodiment.

FIG. 6 is a functional block diagram illustrating a configuration of a base station 10-1 according to a first embodiment. As illustrated in FIG. 6, the base station 10-1 according to the first embodiment includes an antenna array 104, a radio processing unit 110, a DA/AD converting unit 120, an uplink signal detecting unit 130, a downlink signal generating unit 140, an SFN counter 152, a mapping storage unit 156, and an N-PDCCH control unit 160.

The antenna array 104 receives a radio signal from UE 20-1, acquires an electrical high frequency signal, and supplies the high frequency signal to the radio processing unit 110. The antenna array 104 transmits a radio signal to the UE 20-1 based on a high frequency signal supplied from the radio processing unit 110. The base station 10-1 can perform MIMO communication or diversity communication through the antenna array 104 including a plurality of antennas.

The radio processing unit 110 performs an analog process such as amplification, filtering, and down conversion and converts the high frequency signal supplied from the antenna array 104 into a baseband signal (uplink signal). The radio processing unit 110 converts a baseband signal (downlink signal) supplied from the DA/AD converting unit 120 into a high frequency signal.

The DA/AD converting unit 120 converts an uplink signal of an analog format supplied from the radio processing unit 110 into a signal of a digital format, and supplies the signal of the digital format to the uplink signal detecting unit 130. The DA/AD converting unit 120 converts a downlink signal of a digital format supplied from the downlink signal generating unit 140 into a signal of an analog format, and supplies the signal of the analog format to the radio processing unit 110.

The uplink signal detecting unit 130 detects a control signal such as a PUCCH or user data such as a PUSCH from an uplink signal supplied from the DA/AD converting unit 120.

The downlink signal generating unit 140 is a signal generating unit that generates a downlink signal to be transmitted from the base station 10-1. Specifically, the downlink signal generating unit 140 generates a control signal such as a PDCCH or user data such as a PDSCH. The downlink signal generating unit 140 according to the present embodiment arranges, as an extension control area under control by the N-PDCCH control unit 160, a new (N)-PDCCH in a data area of a sub frame according to a periodic mapping pattern. The N-PDCCH may include downlink scheduling information, uplink scheduling information, MU-MIMO control information, CoMP control information, and the like. The base station 10-1 may notify the UE 20-1 of the mapping pattern of the N-PDCCH in advance by dedicated signaling.

The SFN counter 152 counts the rough SFN described above with reference to FIG. 4. The rough SFN is information which is notified to the UE 20-1 through the MIB, but the base station 10-1 also includes a counter that counts an accurate SFN of 10 bits.

The mapping storage unit 156 stores the mapping pattern for arranging the N-PDCCH for each UE 20-1. For example, the mapping pattern may be a periodic pattern which is specified by an SFN representing a reference sub frame position, a sub frame number, and a mapping period. The mapping pattern may be decided by the N-PDCCH control unit 160.

(Arrangement of N-PDCCH)

The N-PDCCH control unit 160 controls an arrangement of the N-PDCCH made by the downlink signal generating unit 140. For example, the N-PDCCH control unit 160 causes the downlink signal generating unit 140 to arrange an N-PDCCH in a data area of a sub frame following a mapping pattern with reference to the mapping storage unit 156. A concrete description will be made below with reference to FIG. 7.

Figure 7:
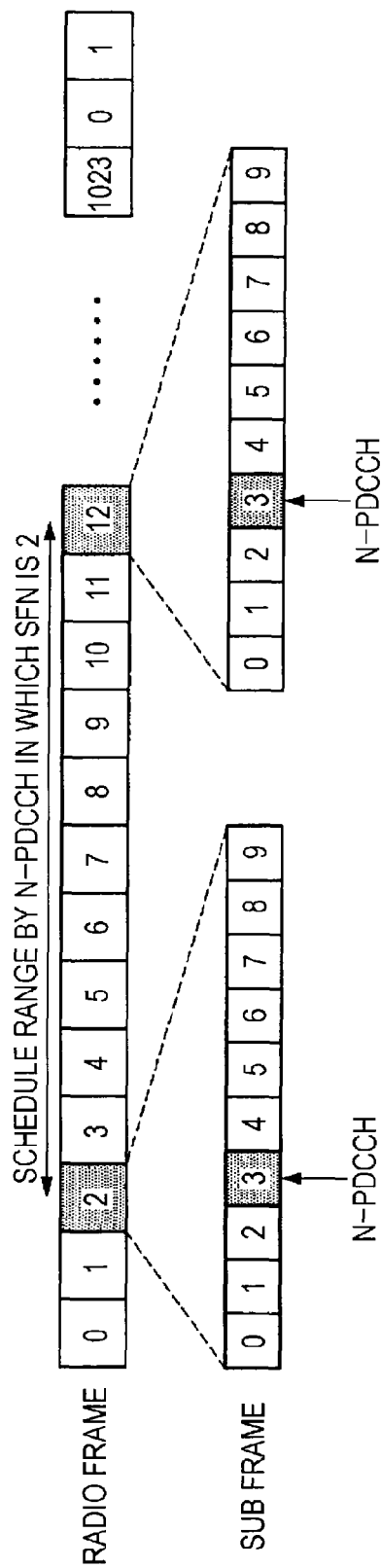
FIG. 7 is an explanatory diagram illustrating an arrangement example of an N-PDCCH.
Figure 8:
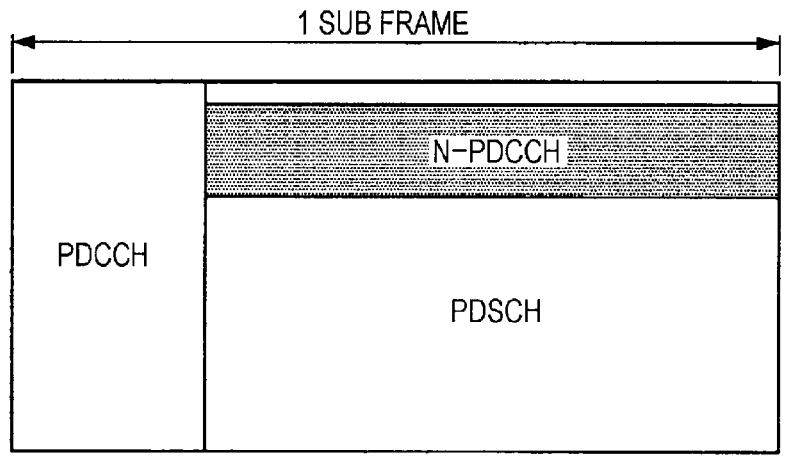
FIG. 8 is an explanatory diagram illustrating an arrangement example of an N-PDCCH.
Figure 9:
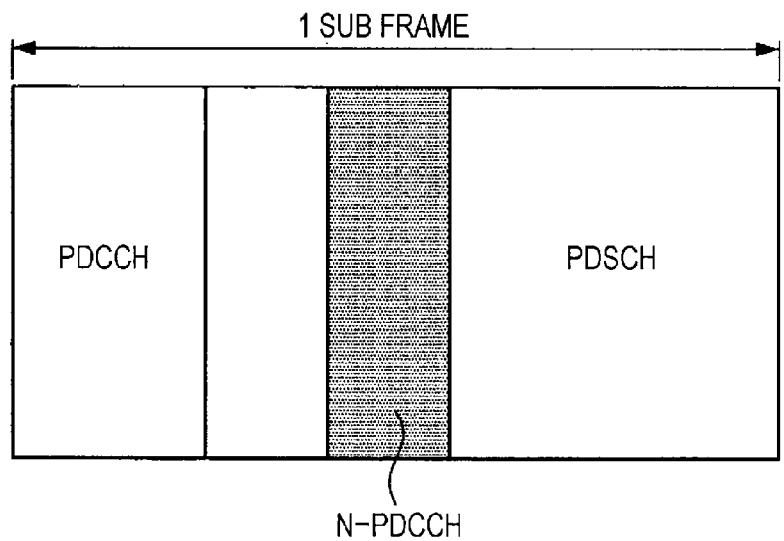
FIG. 9 is an explanatory diagram illustrating an arrangement example of an N-PDCCH.

FIG. 7 is an explanatory diagram illustrating an arrangement example of the N-PDCCH. As illustrated in FIG. 7, an N-PDCCH is arranged in a sub frame #3 of a radio frame at a period of 10 SFNs, for example, like radio frames in which SFNs are 2, 12, 22, . . . , and the like. The downlink signal generating unit 140 may arrange the N-PDCCH in some frequency bands in the data area as illustrated in FIG. 8 or may arrange the N-PDCCH in some time slots in the data area as illustrated in FIG. 9.

As described above, the N-PDCCH may include communication resource assignment information such as the downlink scheduling information and the uplink scheduling information. However, when an N-PDCCH is arranged as illustrated in FIG. 7, each N-PDCCH may include communication resource assignment information of up to a sub frame in which a next N-PDCCH is arranged. For example, when an N-PDCCH is arranged as illustrated in FIG. 7, an N-PDCCH in which an SFN is 2 may include scheduling information of from a sub frame in which an SFN is 2 and a sub frame number is 4 to a sub frame in which an SFN is 12 and a sub frame number is 3.

As described above, the base station 10-1 according to the first embodiment can extend the control area while suppressing a reduction in the throughput by periodically arranging an N-PDCCH. The above-described N-PDCCH arrangement method and the N-PDCCH configuration are exemplary and can be implemented in various forms as will be described below as application examples.

First Application Example

A first application example relates to a method of designating scheduling by an N-PDCCH. The above description has been made in connection with the example in which each N-PDCCH includes scheduling information designating resource blocks between N-PDCCHs. However, when a period of an N-PDCCH increases, the number of bits of scheduling information is considered to increase in order to designate each resource block from all resource blocks presented within a long period.

In this regard, a method of arranging a plurality of N-PDCCHs in a single sub frame and inserting schedule information representing an arrangement of a resource block within a different range into each N-PDCCH is proposed as the first application example. A concrete description will be made below with reference to FIGS. 10 and 11.

Figure 10:
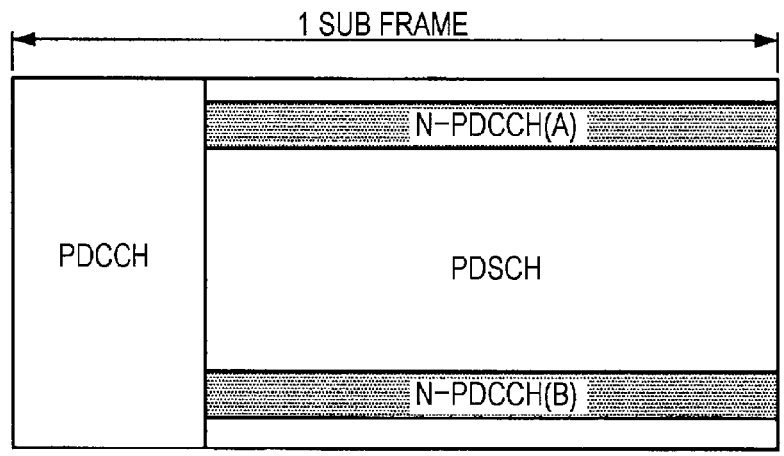
FIG. 10 is an explanatory diagram illustrating an application example of an arrangement form of an N-PDCCH.
Figure 11:
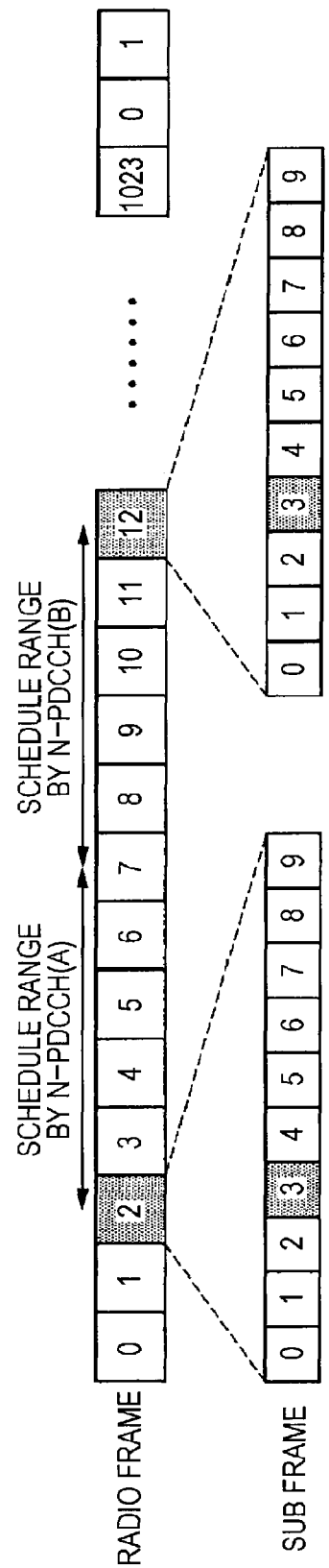
FIG. 11 is an explanatory diagram illustrating a range in which each N-PDCCH is in charge of assignment.

FIG. 10 is an explanatory diagram illustrating an application example of an arrangement form of an N-PDCCH. As illustrated in FIG. 10, the downlink signal generating unit 140 according to the first application example arranges a plurality of N-PDCCHs in different time/frequency domains of a single sub frame. Here, an N-PDCCH(A) illustrated in FIG. 10 is, for example, in charge of assigning resource blocks in the first half as illustrated in FIG. 11, and an N-PDCCH(B) is, for example, in charge of assigning resource blocks in the second half as illustrated in FIG. 11.

Through this configuration, a designation of a resource block by scheduling information included in each N-PDCCH can be performed from a resource block present within a narrow divided range, whereby the number of bits of scheduling information can be reduced. The above description has been made in connection with the example in which a plurality of N-PDCCHs are in charge of assigning different resource blocks in a time direction. However, a plurality of N-PDCCHs may be in charge of assigning different resource blocks in a frequency direction, respectively.

Second Application Example

A second application example relates to a mapping pattern of an N-PDCCH. As a period of an N-PDCCH increases, a transmission/reception delay time increases. A transmission/reception allowable delay time differs according to the UE 20-1. In this regard, a method of deciding a mapping period of an N-PDCCH addressed to each UE 20-1 based on a plurality of periods is proposed as the second application example.

Figure 12:
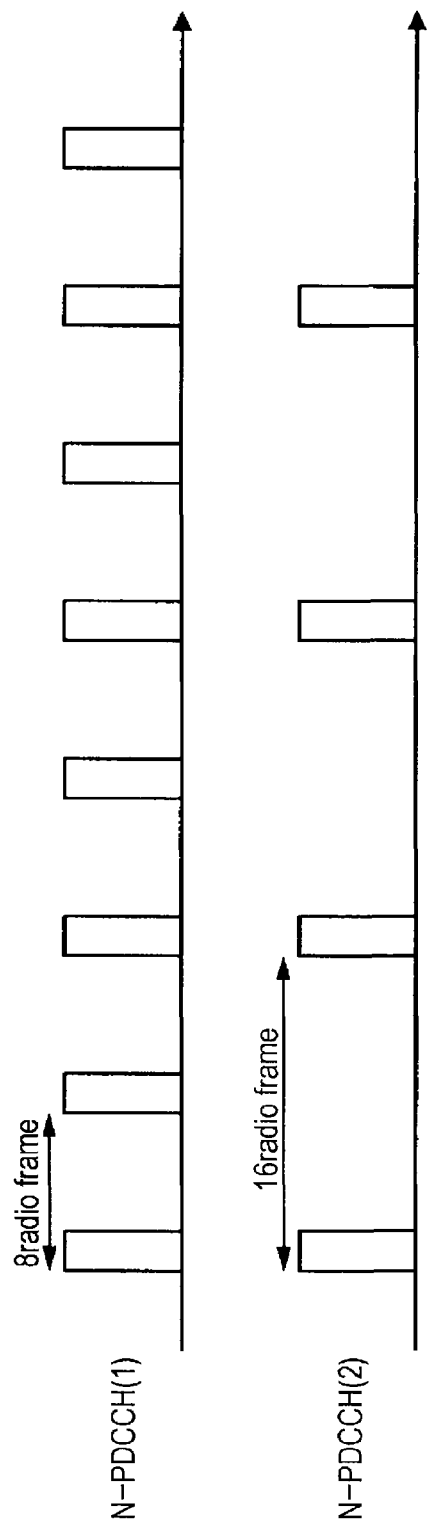
FIG. 12 is an explanatory diagram illustrating a plurality of periods of an N-PDCCH.

For example, the N-PDCCH control unit 160 has a function as a period control unit that decides a mapping period of an N-PDCCH addressed to each UE 20-1 based on a plurality of periods such as a period of 8 radio frames and a period of 16 radio frames as illustrated in FIG. 12. In further detail, the N-PDCCH control unit 160 determines a delay time allowable for transmission and reception of the UE 20-1 based on information received from the UE 20-1. When the allowable delay time is small, the N-PDCCH control unit 160 may decide the period of 8 radio frames as the mapping period of the N-PDCCH addressed to the UE 20-1. The base station 10-1 may notify the UE 20-1 of the mapping pattern having the decided mapping period in advance by dedicated signaling.

As described above, the base station 10-1 according to the second application example can decide a mapping pattern of an N-PDCCH appropriate to, for example, an application executed by the UE 20-1.

Third Application Example

A third application example relates to changing a mapping pattern of an N-PDCCH. Even though the mapping pattern appropriate to the UE 20-1 is decided in the way described in the second application example, a desirable period of the mapping pattern may change depending on a state of the UE 20-1, a change in an application, or the like. Further, when the number of UEs 20-1 belonging to an N-PDCCH following each mapping pattern is not uniform, there may occur a resource shortage in a certain N-PDCCH. In this regard, the third application example proposes changing a mapping pattern of an N-PDCCH addressed to each UE 20-1.

For example, when the number of UEs 20-1 belonging to a certain mapping pattern is larger than an upper limit number, the N-PDCCH control unit 160 may change a mapping pattern of at least one of the UEs 20-1 belonging to the mapping pattern. The N-PDCCH control unit 160 may change the mapping pattern of the UE 20-1 according to a request from the UE 20-1. A period of a non-changed mapping pattern may be different from or identical to a period of a changed mapping pattern. Even though the periods of the mapping patterns are identical to each other, when the number of UEs 20-1 belonging to the mapping pattern is small, a transmission/reception delay time is reduced.

<2-2. Configuration of UE According to First Embodiment>

The configuration of the base station 10-1 according to the first embodiment has been described above. Next, a configuration of the UE 20-1 according to the first embodiment will be described.

Figure 13:
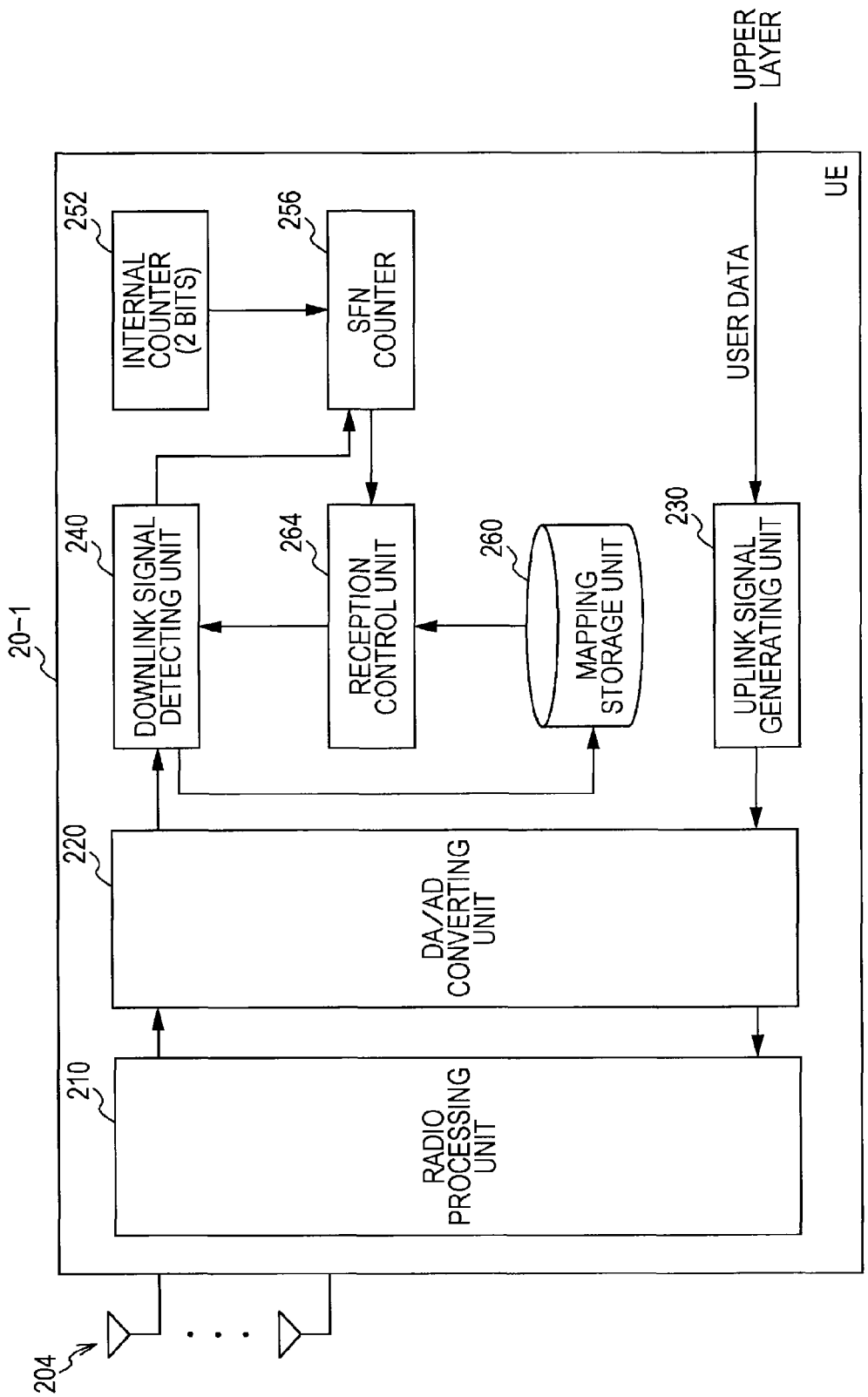
FIG. 13 is a functional block diagram a configuration of UE according to the first embodiment.

FIG. 13 is a functional block diagram illustrating a configuration of the UE 20-1 according to the first embodiment. As illustrated in FIG. 13, the UE 20-1 includes an antenna array 204, a radio processing unit 210, a DA/AD converting unit 220, an uplink signal detecting unit 230, a downlink signal detecting unit 240, an internal counter 252, an SFN counter 256, a mapping storage unit 260, and a reception control unit 264.

The antenna array 204 receives a radio signal from the base station 10-1, acquires an electrical high frequency signal, and supplies the high frequency signal to the radio processing unit 210. The antenna array 204 transmits a radio signal to the base station 10-1 based on a high frequency signal supplied from the radio processing unit 210. The UE 20-1 can perform MIMO communication or diversity communication through the antenna array 204 including a plurality of antennas.

The radio processing unit 210 performs an analog process such as amplification, filtering, and down conversion and converts the high frequency signal supplied from the antenna array 204 into a baseband signal (downlink signal). The radio processing unit 210 converts a baseband signal (uplink signal) supplied from the DA/AD converting unit 220 into a high frequency signal.

The DA/AD converting unit 220 converts a downlink signal of an analog format supplied from the radio processing unit 210 into a signal of a digital format, and supplies the signal of the digital format to the downlink signal detecting unit 240. The DA/AD converting unit 220 converts an uplink signal of a digital format supplied from the uplink signal generating unit 230 into a signal of an analog format, and supplies the signal of the analog format to the radio processing unit 210.

The uplink signal generating unit 230 generates an uplink signal to be transmitted to the base station 10-1. Specifically, the uplink signal generating unit 230 generates a control signal such as a PUCCH or a user data signal such as a PUSCH. As described above, the uplink signal generating unit 230 functions as a transmitting unit together with the antenna array 204, the radio processing unit 210, and the DA/AD converting unit 220.

The downlink signal detecting unit 240 detects a control signal such as a PDCCH or user data such as a PDSCH from a downlink signal supplied from the DA/AD converting unit 220. Particularly, the downlink signal detecting unit 240 according to the present embodiment detects an N-PDCCH arranged according to a periodic mapping pattern under control by the reception control unit 264. As described above, the downlink signal detecting unit 240 functions as a receiving unit together with the antenna array 204, the radio processing unit 210, and the DA/AD converting unit 220.

The internal counter 252 counts 10 ms which is a period of a radio frame as 2 bits as described above with reference to FIG. 4.

The SFN counter 256 is a counting unit that counts an SFN based on a rough SFN included in an MIB detected by the downlink signal detecting unit 240 and a count value obtained by the internal counter 252.

The mapping storage unit 260 stores a mapping pattern of an N-PDCCH. As described above, for example, the mapping pattern may be a periodic pattern which is specified by an SFN representing a reference sub frame position, a sub frame number, and a mapping period. For example, the mapping pattern is notified from the base station 10-1 to the UE 20-1 in advance by dedicated signaling.

The reception control unit 264 controls reception by the receiving unit including the downlink signal detecting unit 240 according to an SFN counted by the SFN counter 256. For example, the reception control unit 264 may determine whether or not a sub frame following a mapping pattern stored in the mapping storage unit 260 has arrived and then cause the receiving unit to perform a reception process in the sub frame following the mapping pattern. Through this configuration, the UE 20-1 can receive an N-PDCCH transmitted from the base station 10-1 in the sub frame following the mapping pattern.

<2-3. Operation According to First Embodiment>

The configurations of the base station 10-1 and the UE 20-1 according to the first embodiment have been described above. Next, operations of the base station 10-1 and the UE 20-1 will be described with reference to FIGS. 14 and 15.

Figure 14:
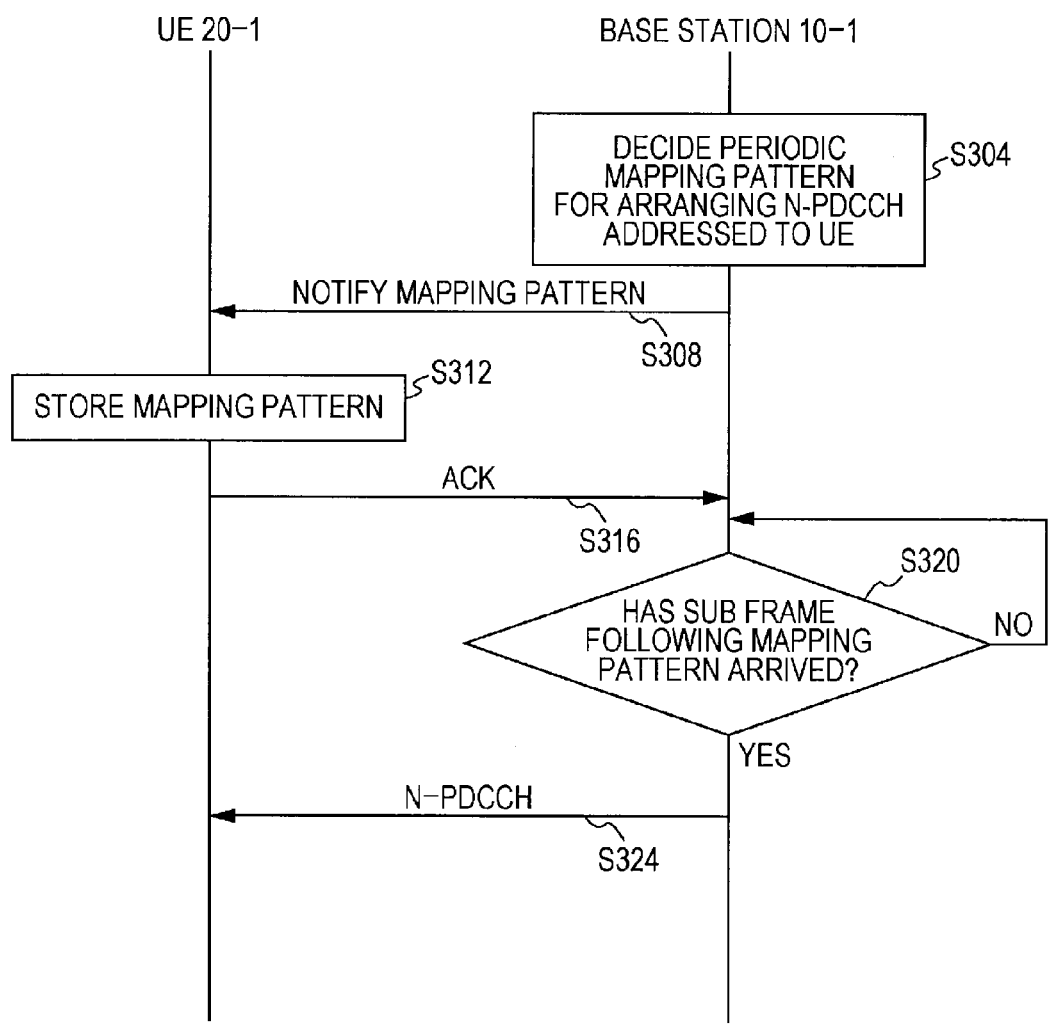
FIG. 14 is a sequence diagram illustrating operations of a base station and UE according to the first embodiment.

FIG. 14 is a sequence diagram illustrating operations of the base station 10-1 and the UE 20-1 according to the first embodiment. As illustrated in FIG. 14, first, when the N-PDCCH control unit 160 of the base station 10-1 decides a periodic mapping pattern for arranging an N-PDCCH addressed to the UE 20-1 (S304), the base station 10-1 notifies the UE 20-1 of the decided mapping pattern (S308).

Then, the UE 20-1 stores the mapping pattern notified from the base station 10-1 in the mapping storage unit 260 (S312), and transmits ACK representing a reception acknowledgement of the mapping pattern to the base station 10-1 (S316).

Thereafter, the N-PDCCH control unit 160 of the base station 10-1 determines whether or not a sub frame following a mapping pattern has arrived (S320). When the sub frame has arrived, the downlink signal generating unit 140 arranges an N-PDCCH in a data area of the sub frame. Then, the base station 10-1 transmits the N-PDCCH arranged in the sub frame to the UE 20-1 (S324).

The mapping pattern can be changed as described above in the third application example. An operation example of changing the mapping pattern will be described with reference to FIG. 15.

Figure 15:
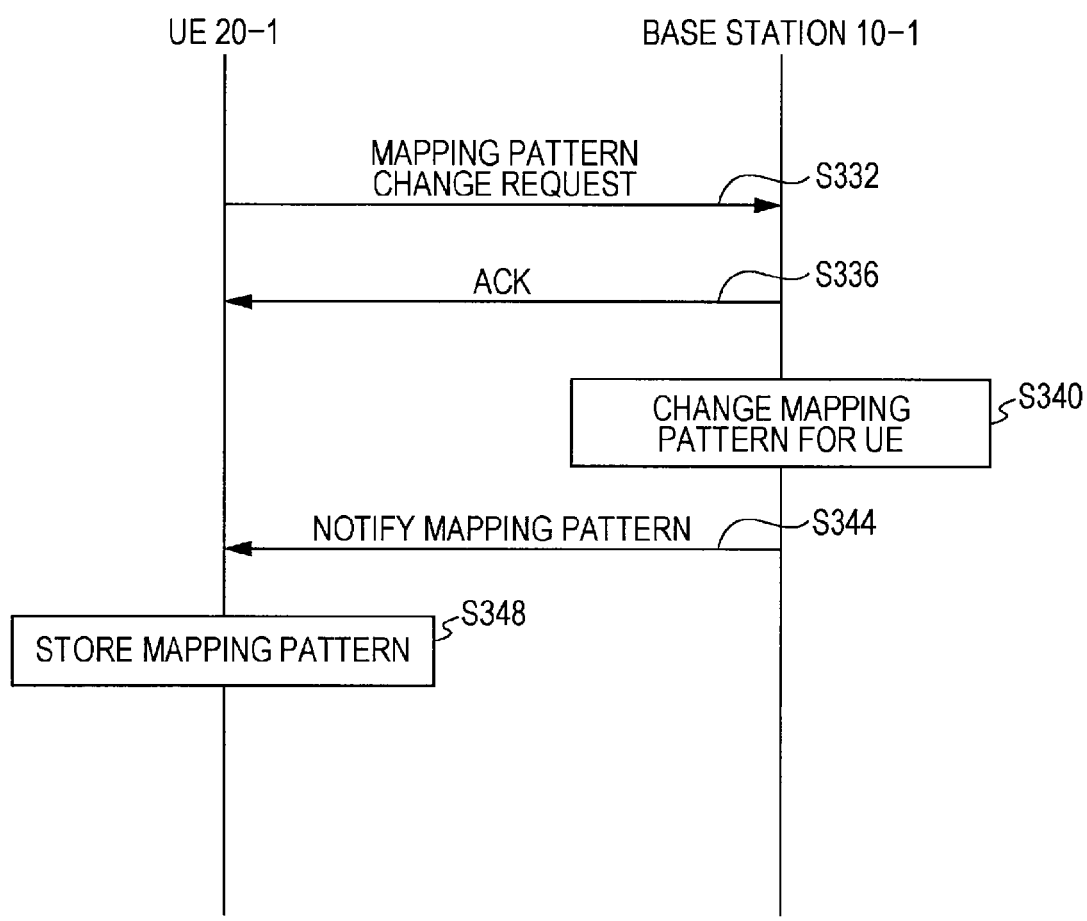
FIG. 15 is a sequence diagram illustrating an operation example of changing a mapping pattern.

FIG. 15 is a sequence diagram illustrating an operation example of changing a mapping pattern. As illustrated in FIG. 15, first, when the UE 20-1 requests the base station 10-1 to change a mapping pattern (S332), the base station 10-1 transmits ACK to the UE 20-1 as a reception acknowledgement (S336). Then, the N-PDCCH control unit 160 of the base station 10-1 changes the mapping pattern for the UE 20-1 (S340).

Thereafter, the base station 10-1 notifies the UE 20-1 of the changed mapping pattern (S344). The UE 20-1 stores the changed mapping pattern notified from the base station 10-1 in the mapping storage unit 260 (S348). In FIG. 15, the example in which the UE 20-1 requests a change of a mapping pattern has been described, but the base station 10-1 may request a change of a mapping pattern. The above description has been made in connection with the example in which the base station 10-1 decides a mapping pattern, but the UE 20-1 may decide a mapping pattern and notify the base station 10-1 of the decided mapping pattern.

According to the first embodiment of the present disclosure, the base station 10-1 periodically arranges N-PDCCHs as described above. Thus, a reduction in the throughput can be suppressed, and the control area can be extended. Accordingly, the base station 10-1 can accommodate many UEs 20-1 (including an MTC terminal).

3. Second Embodiment

Next, a second embodiment of the present disclosure will be described. According to the second embodiment of the present disclosure, it is possible to increase a period recognizable by an UE 20-2. Thus, for example, it is possible to increase a mapping period of an N-PDCCH described in the first embodiment.

(Point of View of Second Embodiment)

Figure 16:
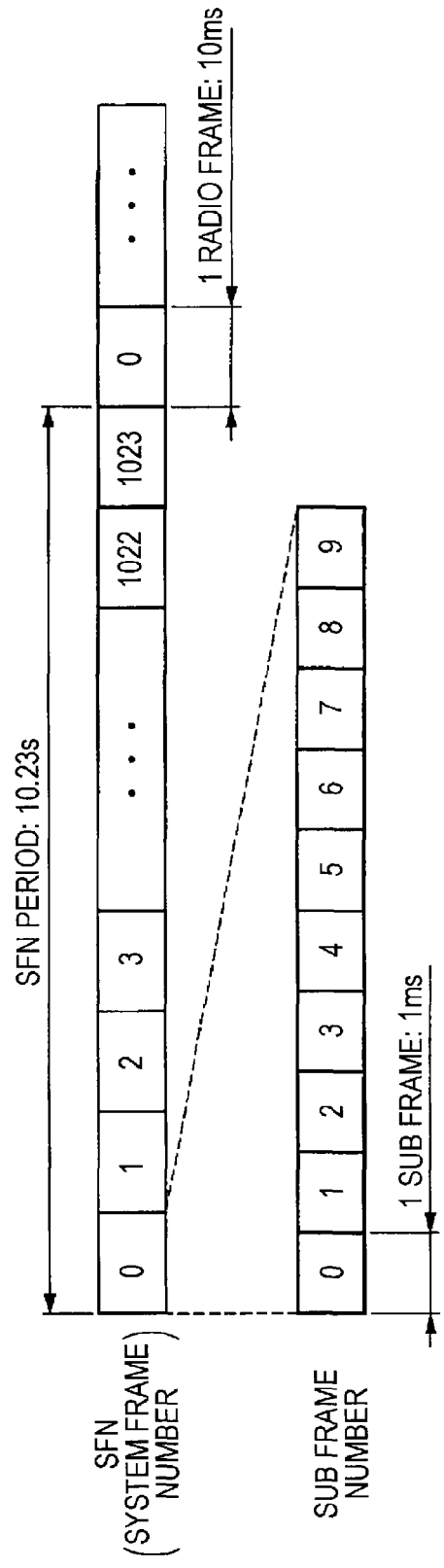
FIG. 16 is an explanatory diagram illustrating an SFN period.

FIG. 16 is an explanatory diagram illustrating an SFN period. As illustrated in FIG. 16, each radio frame of 10 ms is assigned any one of SFNs of 0 to 1023. In other words, the same SFN is assigned at intervals of 1024 radio frames. The UE can recognize a time of up to next 10.23 seconds (10 ms×1024), which is an SFN period based on the SFN. For example, when a current SFN is 3, a time after 4 seconds can be recognized as a radio frame in which an SFN is 403. However, since there is no technique of distinguishing each period of an SFN (10.23), it is difficult for the UE to recognize a time after 10.23 seconds.

(Outline of Second Embodiment)

Figure 17:
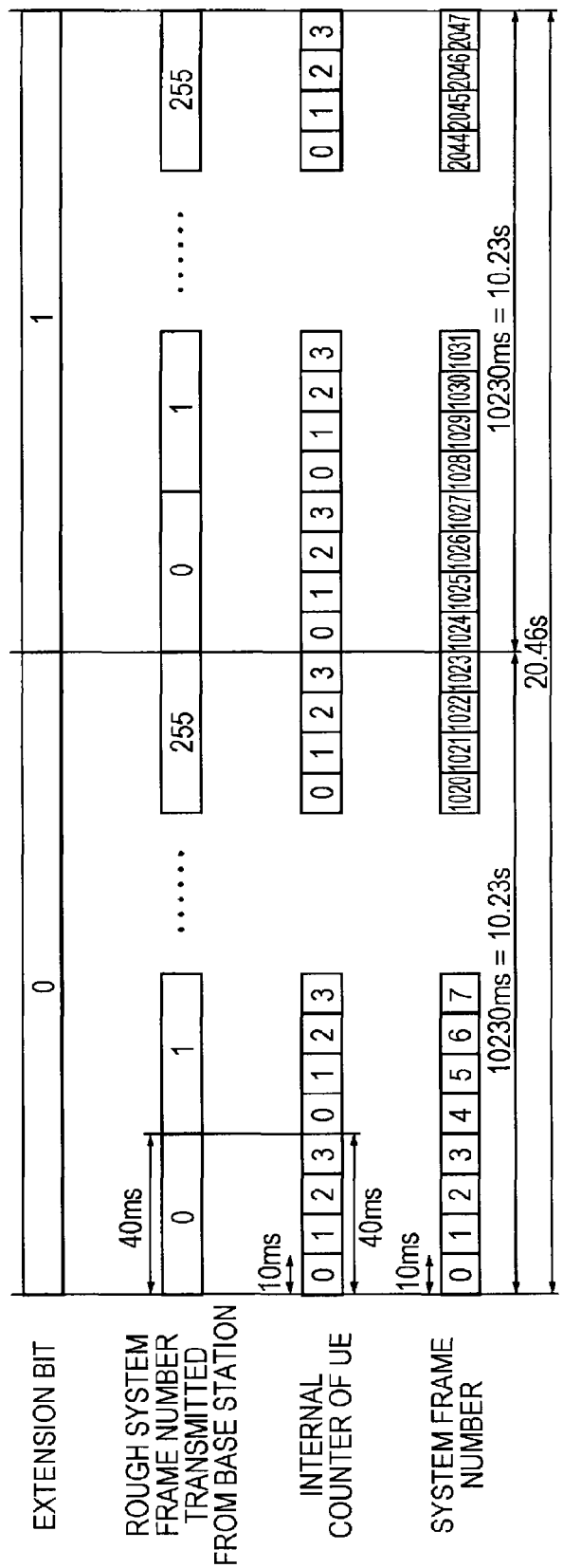
FIG. 17 is an explanatory diagram illustrating an outline of a second embodiment.

In this regard, in the second embodiment, a technique is proposed that sets an extension bit for identifying each period of an SFN. For example, as illustrated in FIG. 17, a base station 10-2 according to the second embodiment sets an extension bit of 1 bit for identifying an SFN period, and then transmits the extension bit through a PBCH. Through this configuration, an SFN is extended to a range of 0 to 2047, and thus the UE 20-2 according to the second embodiment can recognize a time of up to next 20.47 seconds. A time recognizable by the UE 20-2 can be further increased by increasing the number of bits of the extension bit. A configuration of the base station 10-2 for implementing the second embodiment will be described below.

<3-1. Configuration of Base Station According to Second Embodiment>

Figure 18:
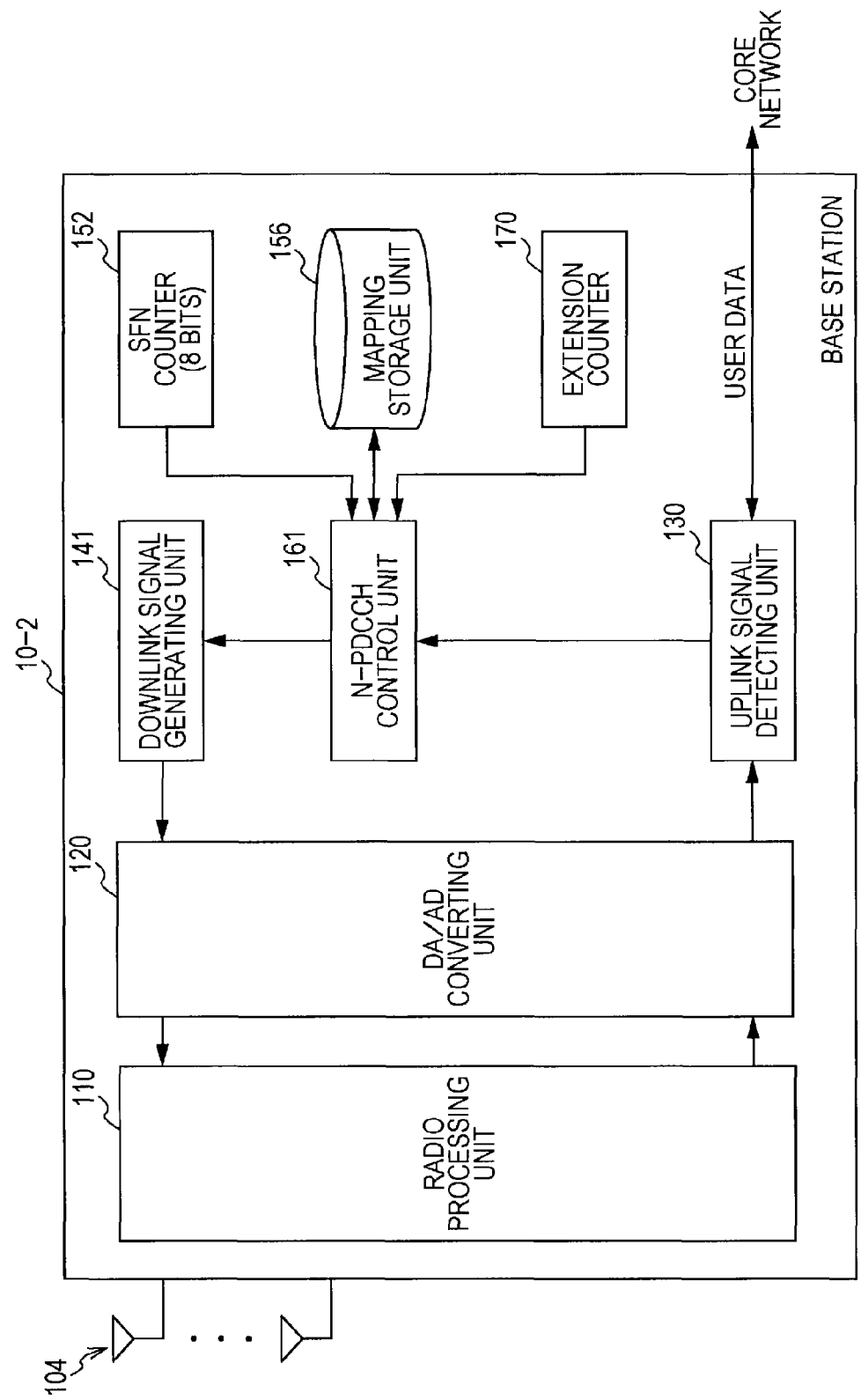
FIG. 18 is a functional block diagram illustrating a configuration of a base station according to the second embodiment.

FIG. 18 is a functional block diagram illustrating a configuration of the base station 10-2 according to the second embodiment. As illustrated in FIG. 18, the base station 10-2 according to the second embodiment includes an antenna array 104, a radio processing unit 110, a DA/AD converting unit 120, an uplink signal detecting unit 130, a downlink signal generating unit 141, an SFN counter 152, a mapping storage unit 156, an N-PDCCH control unit 161, and an extension counter 170. The antenna array 104, the radio processing unit 110, the DA/AD converting unit 120, the uplink signal detecting unit 130, the SFN counter 152, and the mapping storage unit 156 are the same as in the first embodiment, and a detailed description thereof will not be repeated. In the following, one SFN period is defined as a super system frame.

The extension counter 170 counts a lapse of 10.23 seconds which is an SFN period. A super system frame is identified by an extension bit obtained as a counting result of the extension counter 170. For this reason, the number of bits of the extension bit is not particularly limited, but as the number of bits increases, more super system frames can be identified.

The downlink signal generating unit 141 generates system information including an extension bit counted by the extension counter 170. The extension bit may be included in the same MIB as the rough SFN or may be included in any logical block such as the SIB different from the rough SFN.

The downlink signal generating unit 141 generates information representing a mapping pattern of UE 20-2. According to the second embodiment, even when a mapping period is longer than an SFN period, the mapping period can be represented using the extension bit.

The N-PDCCH control unit 161 controls an arrangement of an N-PDCCH by the downlink signal generating unit 141 similarly to the first embodiment. For example, the N-PDCCH control unit 160 causes the downlink signal generating unit 141 to arrange an N-PDCCH in a data area of a sub frame following a mapping pattern with reference to the mapping storage unit 156.

In the second embodiment, since an extension bit for identifying each SFN period is employed, the N-PDCCH control unit 161 can control an arrangement of an N-PDCCH following a mapping pattern with a mapping period longer than 10.23 seconds which is a super system frame period.

As described above, the base station 10-2 according to the second embodiment transmits the extension bit for identifying the super system frame, for example, through a PBCH, and thus the UE 20-2 can identify the super system frame based on the extension bit. In other words, the UE 20-2 according to the second embodiment can recognize a time after 10.23 seconds which is the super system frame period.

<3-2. Modified Embodiment of Second Embodiment>

The above description has been made in connection with the example in which the base station 10-2 transmits the extension bit. However, according to the following modified embodiment, an extension counter is disposed at a UE side, and thus the same effect as in the above-described second embodiment can be obtained even though the base station 10-2 does not transmit the extension bit.

Figure 19:
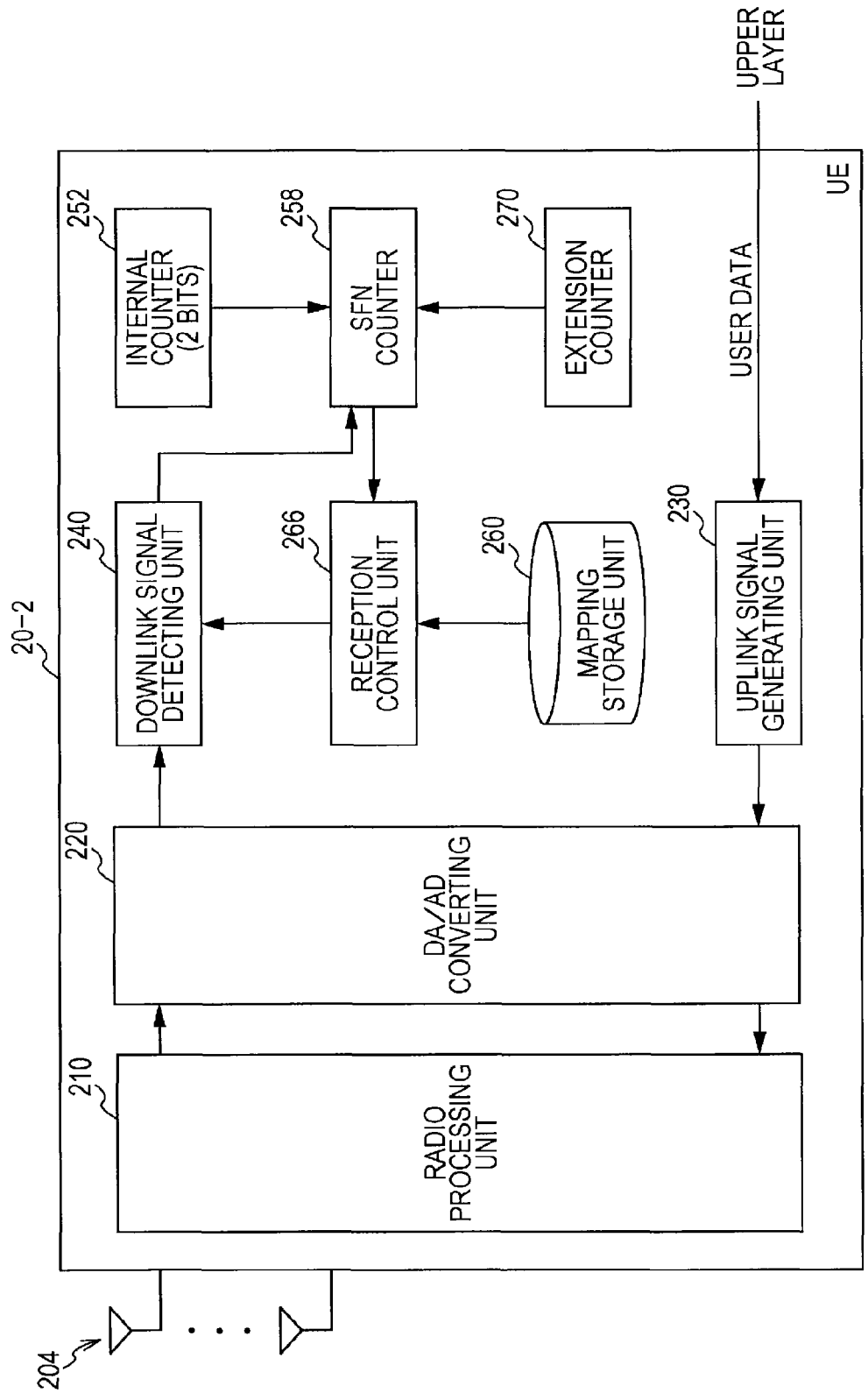
FIG. 19 is a functional block diagram illustrating a configuration of UE according to a modified embodiment of the second embodiment.

FIG. 19 is a functional block diagram illustrating a configuration of UE 20-2 according to the modified embodiment of the second embodiment. As illustrated in FIG. 19, the UE 20-2 according to the modified embodiment includes an antenna array 204, a radio processing unit 210, a DA/AD converting unit 220, an uplink signal detecting unit 230, a downlink signal detecting unit 240, an internal counter 252, an SFN counter 258, a mapping storage unit 260, a reception control unit 266, and an extension counter 270. The antenna array 204, the radio processing unit 210, the DA/AD converting unit 220, the uplink signal detecting unit 230, the downlink signal detecting unit 240, and the internal counter 252 are the same as in the first embodiment, and thus a detailed description thereof will not be repeated.

The extension counter 270 counts a lapse of 10.23 seconds which is an SFN period. A super system frame is identified by an extension bit obtained as a counting result of the extension counter 270. For this reason, the number of bits of the extension bit is not particularly limited, but as the number of bits increases, more super system frames can be identified. A point to start a count of a super system frame may be decided in advance by signaling with the base station 10-2.

The SFN counter 258 counts an SFN based on a rough SFN included in an MIB detected by the downlink signal detecting unit 240, a bit value counted by the internal counter 252, and an extension bit value counted by the extension counter 270. For example, when the extension bit is "1", the rough SFN is "255", and the count value obtained by the internal counter 252 is "2", "2046" is obtained as an SFN count value by the SFN counter 258 as illustrated in FIG. 17. As described above, the SFN counter 258 according to the second embodiment functions a counting unit for counting an SFN together with the internal counter 252 and the extension counter 270.

The reception control unit 266 controls reception by the receiving unit including the downlink signal detecting unit 240 according to an SFN counted by the SFN counter 256. For example, the reception control unit 264 may determine whether or not a sub frame following a mapping pattern stored in the mapping storage unit 260 has arrived and then cause the receiving unit to perform a reception process in the sub frame following the mapping pattern.

Here, according to the present modified embodiment, the super system frame is identified based on the extension bit through the SFN counter 258. Thus, even when the mapping period of the N-PDCCH is longer than 10.23 seconds which is a super system frame length, the reception control unit 266 can appropriately control reception of an N-PDCCH through the receiving unit including the downlink signal detecting unit 240. Further, according to the present modified embodiment, there is a merit that the base station 10-2 side may not transmit the extension bit through a PBCH.

4. Third Embodiment (Point of View of Third Embodiment)

The UE 20-2 according to the modified embodiment of the second embodiment can count many super system frames using the extension counter 270 as described above. For this reason, the UE 20-2 according to the modified embodiment of the second embodiment can remain in the sleep state for a long time and then return from the sleep state when the counting result reaches a target frame (for example, a sub frame in which an N-PDCCH is arranged).

However, an obtained counting result may be inaccurate depending on the accuracy of an oscillator such as the internal counter 252. For example, when the accuracy of an oscillator is 1 ppm, an error of 0.6048 seconds may occur in 7 days as expressed in the following Formula:

Estimated possible error=7 days×24 hours×3600 seconds×1/1000000=0.6048 seconds 0.6048 seconds is equal to a sum time length of about 60 radio frames. In other words, in the case in which the mapping period of the N-PDCCH is 7 days, even though the UE transitions to the sleep state and then returns from the sleep state when the counting result reaches the target frame, there may be a case in which transmission of an N-PDCCH from the base station 10 has ended before 60 radio frames.

A third embodiment of the present disclosure has been made in light of the foregoing. According to the third embodiment of the present disclosure, even when the sleep state is maintained for a long time, a signal transmitted through a target frame can be more reliably received. A configuration and an operation of UE 20-3 according to the third embodiment will be described below in detail.

Figure 20:
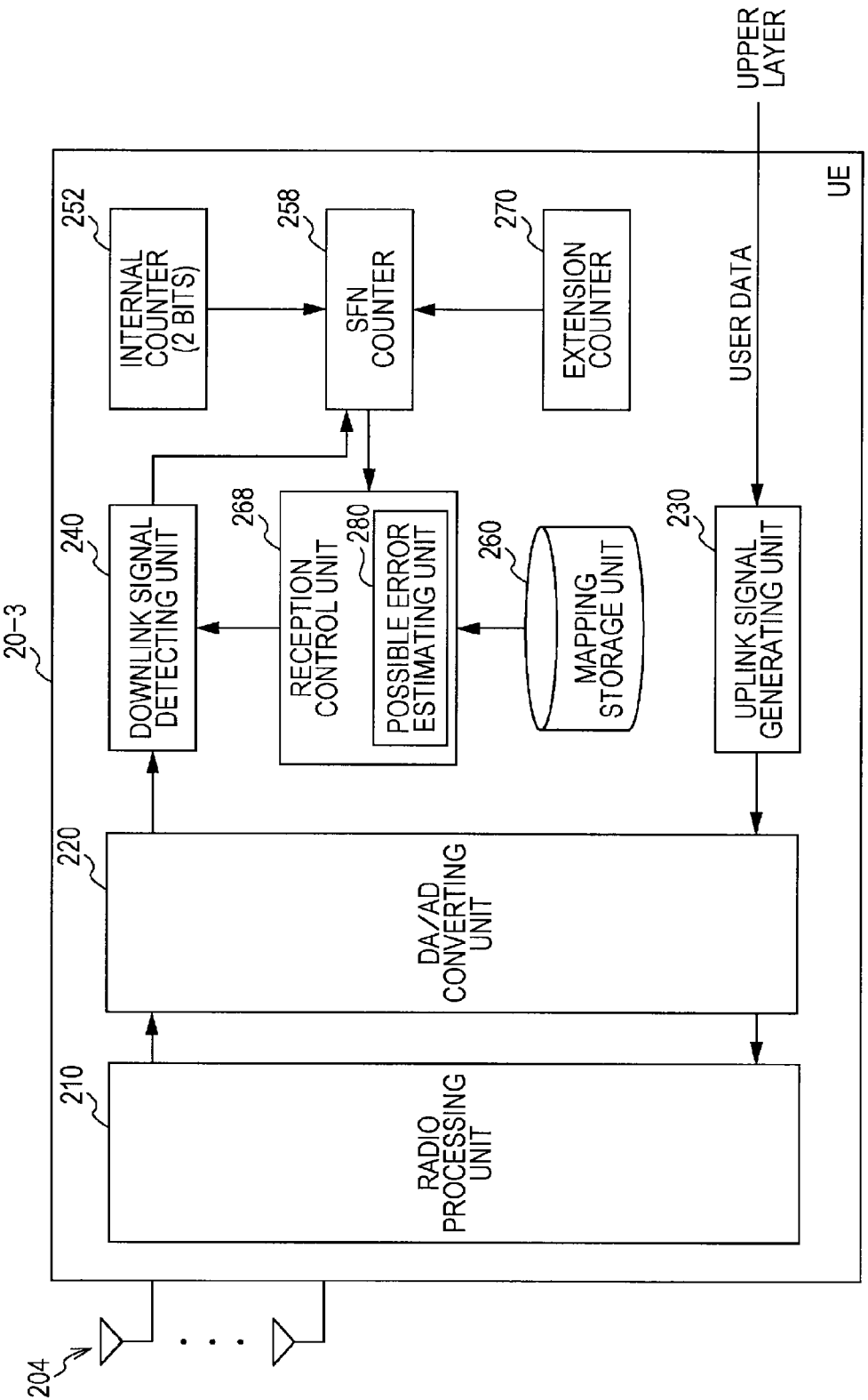
FIG. 20 is a functional block diagram illustrating a configuration of UE according to a third embodiment.

FIG. 20 is a functional block diagram illustrating a configuration of the UE 20-3 according to the third embodiment. As illustrated in FIG. 20, the UE 20-3 according to the third embodiment includes an antenna array 204, a radio processing unit 210, a DA/AD converting unit 220, an uplink signal detecting unit 230, a downlink signal detecting unit 240, an internal counter 252, an SFN counter 258, a mapping storage unit 260, a reception control unit 268, and an extension counter 270. The antenna array 204, the radio processing unit 210, the DA/AD converting unit 220, the uplink signal detecting unit 230, the downlink signal detecting unit 240, the internal counter 252, the extension counter 270, and the like are the same as in the second embodiment, and thus a detailed description thereof will not be repeated.

The reception control unit 268 performs control such that the receiving unit including the downlink signal detecting unit 240 transitions to the sleep state or returns to a reception state from the sleep state. Here, when the receiving unit is in the sleep state, the SFN is counted based on the counting results of the internal counter 252 and the extension counter 270, but an error may occur depending on the accuracy of an oscillator such as the internal counter 252. For this reason, the reception control unit 268 according to the third embodiment has a function of a possible error estimating unit 280 that estimate a count error occurring during the sleep state.

Specifically, the possible error estimating unit 280 estimates a possible error based on the length of the sleep state and the accuracy of an oscillator. For example, when the length of the sleep state is 7 days and the accuracy of an oscillator is 1 ppm, the possible error estimating unit 280 estimates about 0.6048 seconds as a possible error as expressed in the above formula. 0.6048 seconds is equal to a sum time length of about 60 radio frames.

The reception control unit 268 causes the receiving unit to return from the sleep state based on the possible error estimated by the possible error estimating unit 280 before the counting result by the SFN counter 258 reaches the target frame. Here, a positional difference between a radio frame in which the reception control unit 268 causes the receiving unit to return from the sleep state and the target frame may be larger than radio frames whose number correspond to the possible error estimated by the possible error estimating unit 280.

Further, the reception control unit 268 detects an accurate current SFN from a reception result of the returned receiving unit, and causes the receiving unit to transition to the sleep state again over a time period corresponding to the difference between the accurate current SFN and the SFN of the target frame. According to this configuration, since it is unnecessary to continuously cause the receiving unit to remain in the reception state until the target frame after first return, power consumption of UE 20-3 can be reduced. This sleep control will be concretely described below with reference to FIG. 21.

Figure 21:
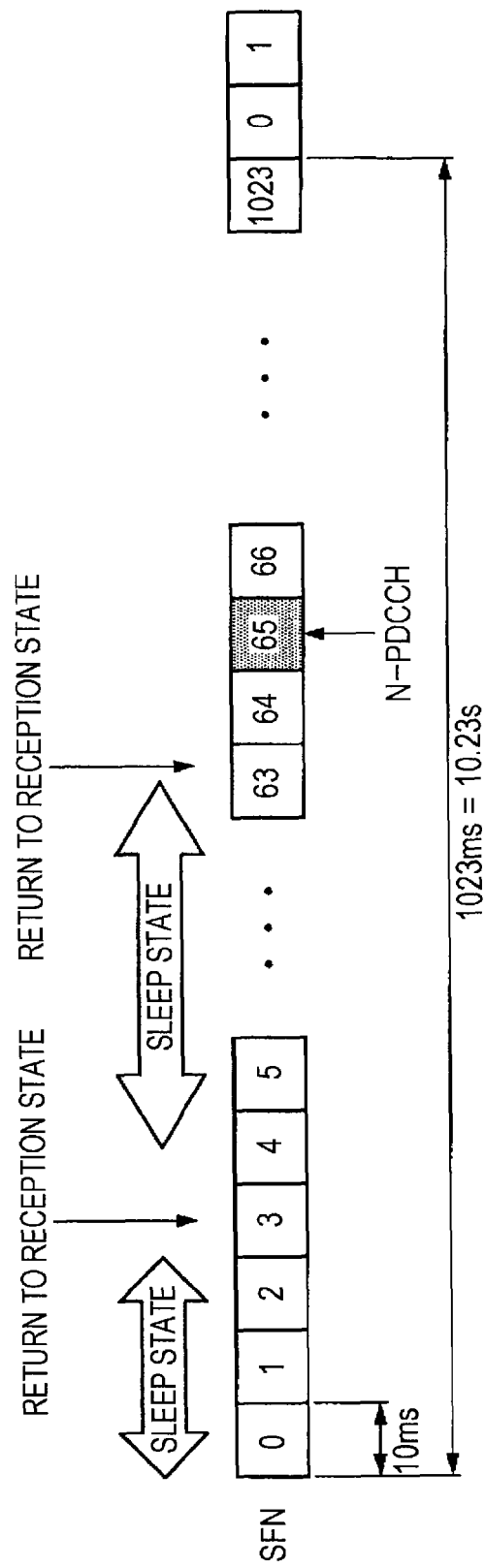
FIG. 21 is an explanatory diagram illustrating a concrete example of sleep control according to the third embodiment.

FIG. 21 is an explanatory diagram illustrating a concrete example of the sleep control according to the third embodiment. In further detail, FIG. 21 illustrates a concrete example of the sleep control when an SFN of a radio frame in which an N-PDCCH is arranged is "65" and a possible error of about 0.6048 seconds is estimated by the possible error estimating unit 280.

In this case, the reception control unit 268 causes the receiving unit to return from the sleep state before about 60 radio frames (for example, SFN=3) from a target frame (SFN=65) as illustrated in FIG. 21. Then, the reception control unit 268 detects an accurate current SFN, and causes the receiving unit to transition to the sleep state again over about 60 radio frames which is a difference with the target frame. Thereafter, the reception control unit 268 causes the receiving unit to return from the sleep state before the target frame (for example SFN=63). Through this configuration, an N-PDCCH can be received through the target frame. Further, by causing the receiving unit to transition to the sleep state again, power necessary to receive about 60 radio frames can be reduced.

First Application Example

Figure 22:
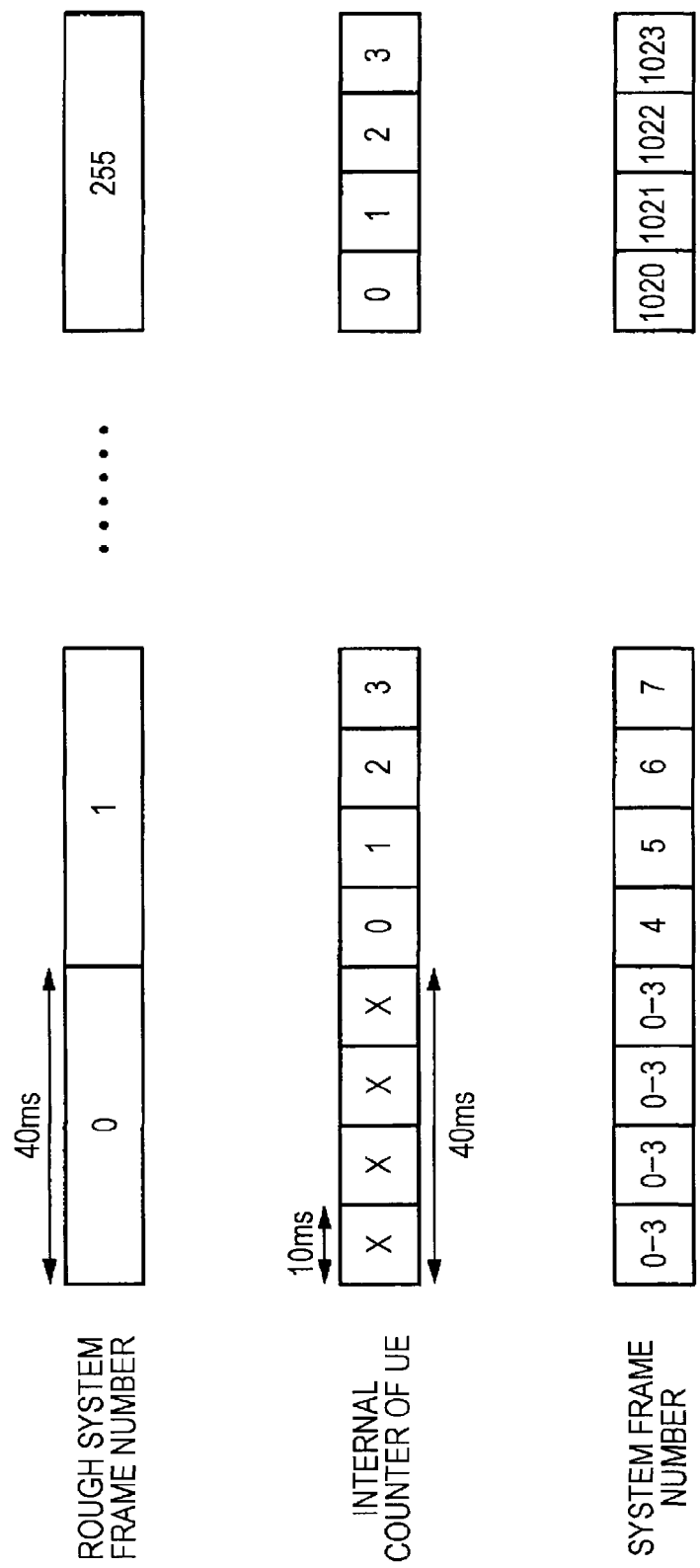
FIG. 22 is an explanatory diagram illustrating a method of specifying an SFN.

As described above, the rough SFN transmitted from the base station 10 is information of 8 bits updated at a period of 40 ms. A complete SFN is obtained such that the internal counter 252 counts a lapse of 10 ms from a time when the rough SFN is updated. In this case, before an update of the rough SFN is detected, it is difficult to specify an accurate SFN even though it is possible to detect a rough SFN. For example, as illustrated in FIG. 22, even though a rough SFN "0" included in an MIB is detected, if an update of the rough SFN to "0" is not detected, it is difficult for the SFN counter 258 to specify an accurate SFN even though it is possible for the SFN counter 258 to know that an SFN is in a range of "0" to "3".

Thus, the reception control unit 268 may cause the receiving unit to transition to the sleep state again after an update of the rough SFN is detected when first return from the sleep state has been made. Through this configuration, the SFN counter 258 can specify an accurate current SFN.

Second Application Example

However, it may take 40 ms to detect an update of the rough SFN. When the receiving unit remains in the reception state during this time period, power consumption increases. In this regard, as an alternative, the reception control unit 268 may cause the receiving unit to transition to the sleep state again before the update of the rough SFN is detected when first return from the sleep state has been made. In this case, it is possible to detect a rough current SFN, and so the reception control unit 268 can control a second sleep time based on the rough current SFN.

Third Application Example

In addition, in the second application example, power consumption can be further reduced by devising a relation between a first return frame and a second return frame. This point will be concretely described with reference to FIG. 23.

Figure 23:
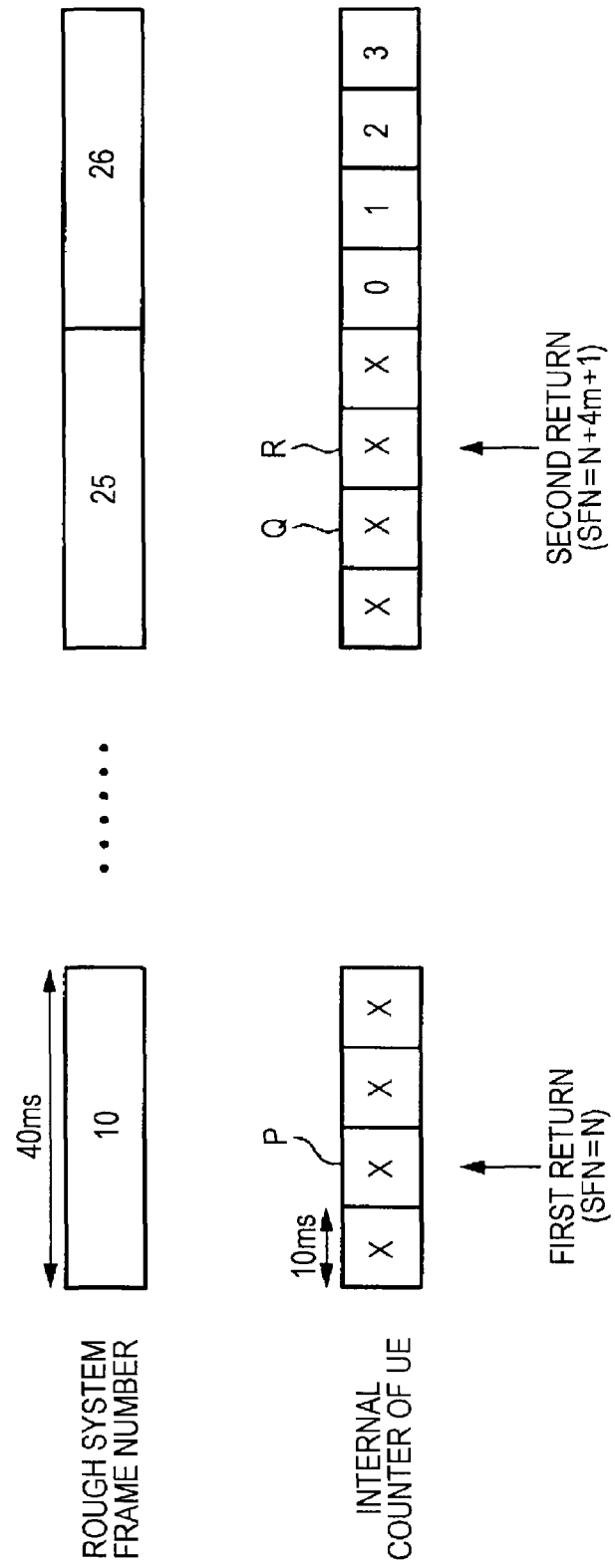
FIG. 23 is an explanatory diagram illustrating an application example of the third embodiment.

FIG. 23 is an explanatory diagram illustrating an application example of the third embodiment. Let us consider a case in which the reception control unit 268 controls first return of the receiving unit from the sleep state in a radio frame P and then causes the receiving unit to transition to the sleep state again before an update of the rough SFN is detected as illustrated in FIG. 23. In this case, an accurate SFN of the radio frame P is unclear, but it is possible to specify a difference between an SFN of the radio frame P and an SFN of another radio frame.

For example, when an SFN of a radio frame P is "N", an SFN of a radio frame Q illustrated in FIG. 23 is represented by "N+4m", and an SFN of a radio frame Q is represented by "N+4m+1 (m is a positive integer)".

Here, when the update of the rough SFN has not been detected in the radio frame P in which the receiving unit has made first return, the update of the rough SFN is not detected even in the radio frame Q in which the SFN is represented by "N+4m". Thus, the reception control unit 268 may perform control such that the receiving unit makes second return in a radio frame (for example, a radio frame R) in which the SFN is represented, for example, by "N+4m+1" other than "N+4m". Through this configuration, it is possible to reduce a time until the update of the rough SFN is detected after second return.

<4-2. Operation According to Third Embodiment>

The configuration of the UE 20-3 according to the third embodiment of the present disclosure has been described above. Next, an operation according to the third embodiment will be described with reference to FIG. 24.

Figure 24:
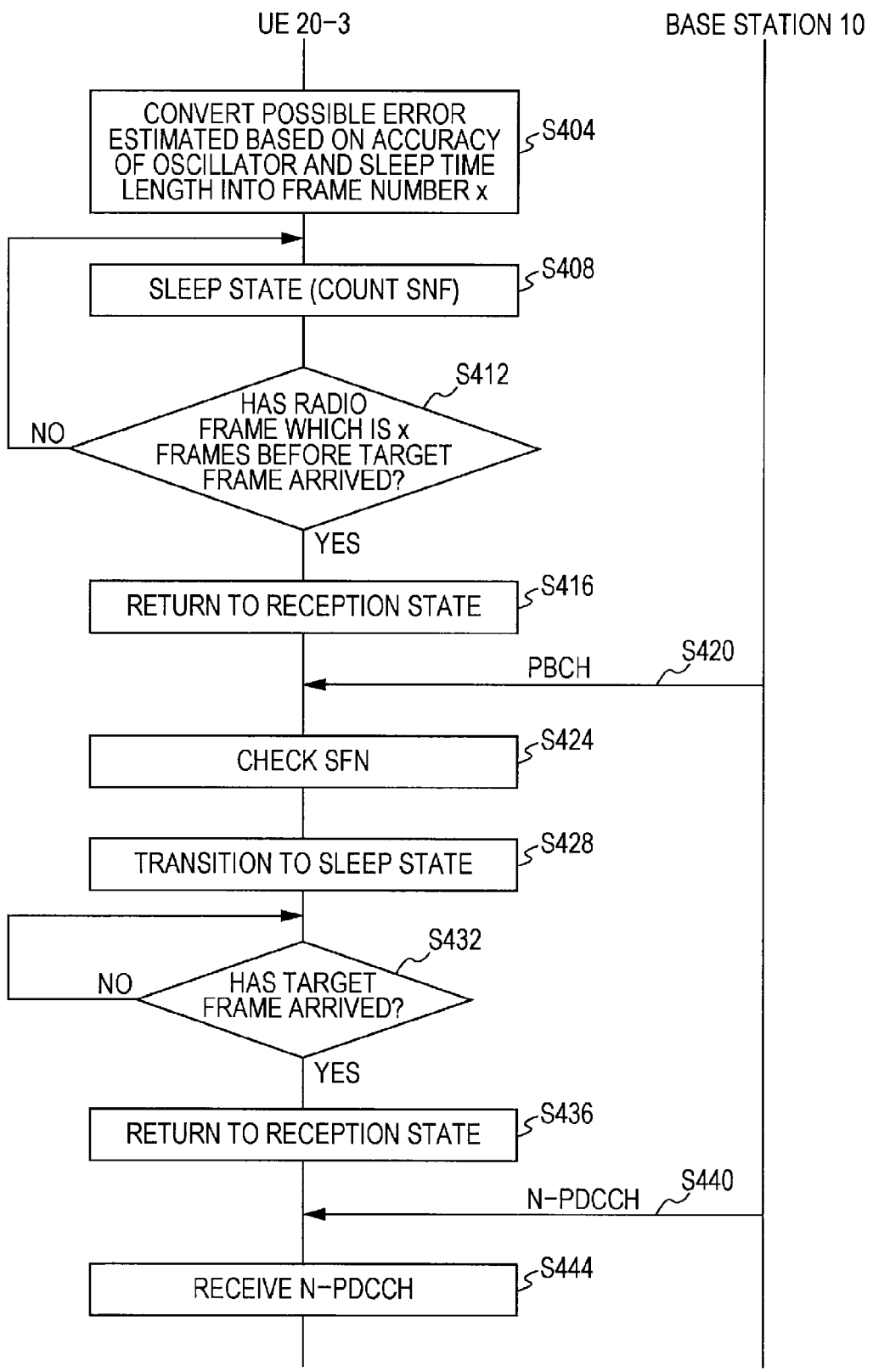
FIG. 24 is a sequence diagram illustrating an operation according to the third embodiment.

FIG. 24 is a sequence diagram illustrating an operation according to the third embodiment. As illustrated in FIG. 24, first, the possible error estimating unit 280 of the UE 20-3 estimates a possible error based on the accuracy of an oscillator and a sleep time length, and converts the possible error into a radio frame number x (S404). Then, the reception control unit 268 causes the receiving unit including the downlink signal detecting unit 240 to transition to the sleep state (S408). During that time, the SFN counter 258 continuously counts an SFN using a count value by the internal counter 252.

Then, when the SFN counting result has reached a radio frame before x frames from a target frame (S412), the reception control unit 268 causes the receiving unit to return to the reception state from the sleep state (S416). Thereafter, the SFN counter 258 checks a current SFN based on a rough SFN included in a PBCH received from the base station 10 (S420 and S424). Then, the reception control unit 268 causes the receiving unit to transition to the sleep state again over a time period corresponding to a difference between the current SFN and the target frame (S428).

Thereafter, the reception control unit 268 causes the receiving unit to return to the reception state from the sleep state before the SFN counting result reaches the target frame (S436). As a result, the UE 20-3 can receive an N-PDCCH transmitted through the target frame from the base station 10 (S440 and S444).

<4-3. Modified Embodiment>

The above description has been made in connection with the example in which sleep control is performed in terms of an error of an oscillator of the UE 20-3. However, an error of an oscillator may be larger than a super system frame including a single SFN period (1023 radio frames). For example, when the accuracy of an oscillator of the UE 20-3 is 4 ppm and the sleep time length is 30 days, an error of 10.368 seconds may occur as expressed in the following formula. 10.368 seconds is larger than 10.24 seconds which is a super system frame length corresponding to a sum length of 1037 radio frames.

Estimated possible error=30 days×24 hours×3600 seconds×4/1000000=10.368 seconds

Thus, when the base station 10 does not transmit the extension bit for identifying the super system frame and the UE 20-3 counts the extension bit instead, the UE 20-3 may erroneously recognize a current super system frame.

In this regard, a method of causing the UE 20-3 to receive a desired signal even when a possible error in the sleep state is larger than a single super system frame will be described below as a modified embodiment of the third embodiment.

First Modified Embodiment

A base station 10 according to a first modified embodiment of the third embodiment arranges an N-PDCCH not only in a sub frame of a radio frame following a mapping pattern but also in sub frames of radio frames of previous and next super system frames having the same SFN as the corresponding radio frame. A concrete description will be made below with reference to FIG. 25.

Figure 25:
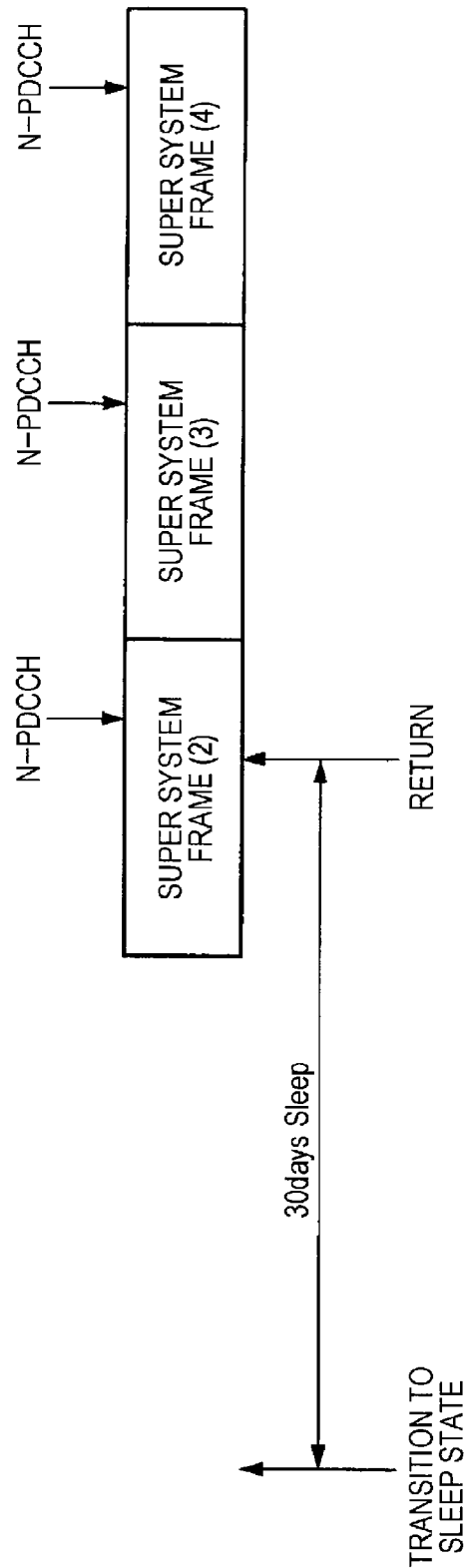
FIG. 25 is an explanatory diagram illustrating a first modified embodiment of the third embodiment.

FIG. 25 is an explanatory diagram illustrating the first modified embodiment of the third embodiment. As illustrated in FIG. 25, the base station 10 according to the first modified embodiment transmits an N-PDCCH not only through a super system frame (3) following a mapping pattern but also through the same sub frames of radio frames of previous and next system frames (2) and (4) having the same SFN. Through this configuration, even though the UE 20-3 has erroneously recognized one super system frame, the UE 20-3 can receive an N-PDCCH through super system frames before and after a correct super system frame.

Further, when the UE 20-3 has received an N-PDCCH through a certain super system frame, the base station 10 may not transmit an N-PDCCH through the super system frame subsequent. Through this configuration, it is possible to suppress communication resources from being expended. In FIG. 25, the example in which an N-PDCCH is transmitted through the super system frames (2) and (4) before and after the super system frame (3) following the mapping pattern has been described. However, an N-PDCCH may be transmitted through the super system frame (2) directly before the super system frame (3) following the mapping pattern or through the super system frame (4) directly after the super system frame (3). In addition, a super system frame used to transmit an N-PDCCH is not limited to a super system frame directly before or directly after the super system frame (3) following the mapping pattern, and an N-PDCCH may be transmitted through a super system frame which is before several frames or after several frames.

Second Modified Embodiment

The UE 20-3 according to the second modified embodiment of the third embodiment treats not only a sub frame of a radio frame following a mapping pattern but also a radio frame of a super system frame different having the same SFN as the corresponding radio frame as a target frame. A concrete description will be made below with reference to FIG. 26.

Figure 26:
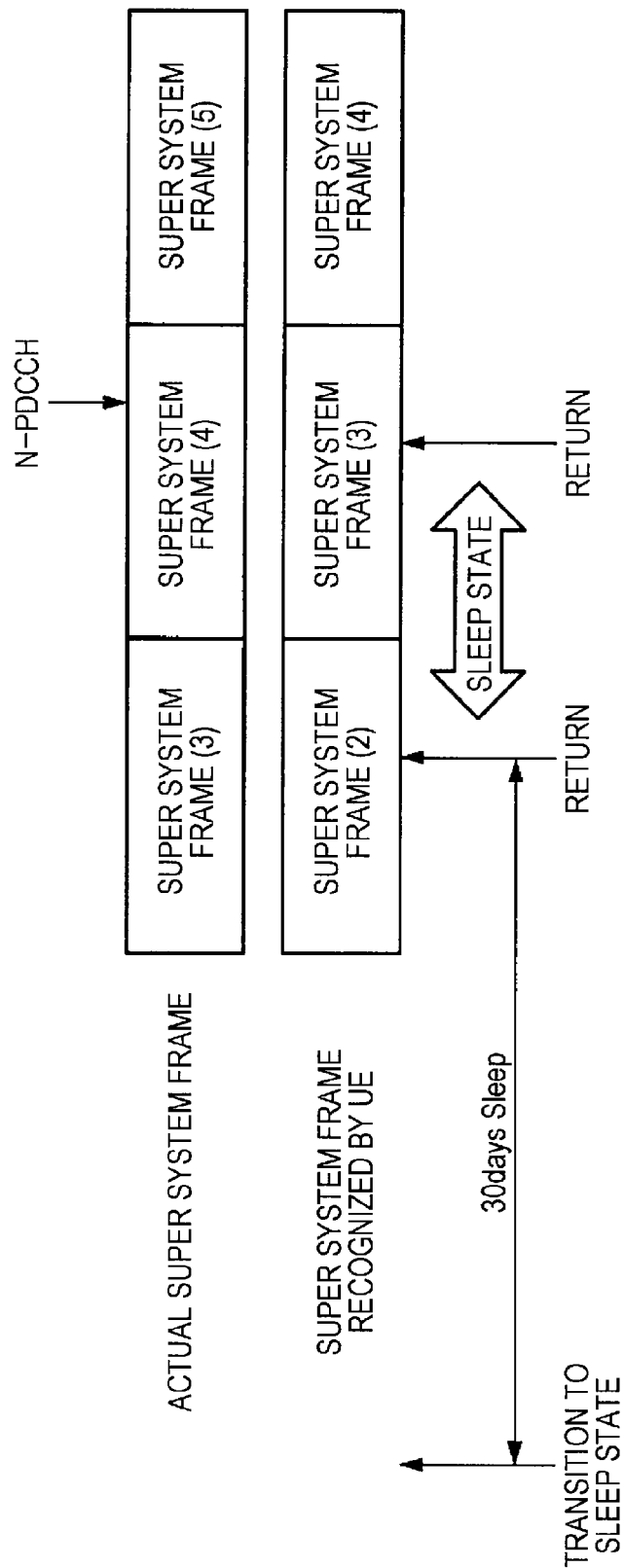
FIG. 26 is an explanatory diagram illustrating a second modified embodiment of the third embodiment.

FIG. 26 is an explanatory diagram illustrating a second modified embodiment of the third embodiment. As illustrated in FIG. 26, the base station 10 transmits an N-PDCCH through a super system frame (4) following a mapping pattern. However, a super system frame recognized by the UE 20-3 may be deviated from an actual super system frame as illustrated in FIG. 26. In this case, the UE 20-3 makes an attempt to receive at the position recognized as the super system frame (4), but transmission of an N-PDCCH has already ended.

Thus, the UE 20-3 according to the second modified embodiment may return from the sleep state in order to receive a specified radio frame in the super system frame (2) recognized by the UE 20-3 as illustrated in FIG. 26. Then, when there is no N-PDCCH addressed to the UE 20-3, the UE 20-3 according to the second modified embodiment may transition to the sleep state until return in order to receive a specified radio frame in the next super system frame (3) recognized by the UE 20-3.

In the example illustrated in FIG. 26, the super system frame (3) recognized by the UE 20-3 is actually the super system frame (4) following the mapping pattern. Thus, the UE 20-3 can receive an N-PDCCH addressed to itself through the actual super system frame (4). Further, return from the sleep state according to the second modified embodiment may be performed in two steps as described in the third embodiment.

<<5. Conclusion>>

As described above, according to the first embodiment of the present disclosure, the base station 10-1 periodically arranges an N-PDCCH, so that a reduction in the throughput can be suppressed, and the control area can be extended. As a result, the base station 10-1 can accommodate more UE 20-1 (including an MTC terminal).

Further, according to the second embodiment of the present disclosure, since a period recognizable by the UE 20-2 can be increased, for example, the mapping period of the N-PDCCH can be increased to be larger than the super system frame length.

In addition, according to the third embodiment of the present disclosure, even when the sleep state of the UE 20-3 is maintained for a long time, power consumption can be reduced, and a signal transmitted through a target frame can be appropriately received.

The preferred embodiments of the present invention have been described above in detail with reference to the accompanying drawings, whilst the technical scope of the present disclosure is not limited to the above examples, of course. A person skilled in the art may find various alternations and modifications within the scope of the appended claims, and it should be understood that they will naturally come under the technical scope of the present disclosure.

For example, steps of the processes of the base station 10 and the UE 20 of the present disclosure need not necessarily processed in time series according to an order described as a sequence diagram. For example, steps of the processes of the base station 10 and the UE 20 of the present disclosure may be processed in an order different from an order described as a sequence diagram or may be processed in parallel.

Further, a computer program may be created that causes hardware, which is installed in the base station 10 and the UE 20 such as a central processing unit (CPU), a read only memory (ROM), and a random access memory (RAM), to perform functions equivalent to the components of the base station 10 and the UE 20. Further, a storage medium storing the computer program is also provided.

The above-described embodiments, the modified embodiments, and the application examples may be appropriately combined and implemented.

The following configurations also belong to the technical scope of the present disclosure.

According to a communication device embodiment, the device includes a signal generation device that generates a wireless communications signal that includes a subframe within a radio frame, wherein said subframe includes an extension control area in a data area of said subframe, and said extension control area is set according to a periodic mapping pattern.

According to one aspect, said extension control area is one of a plurality of extension control areas contained in the subframe, and said signal generation device includes schedule information that describes an arrangement of resource blocks within different ranges into each of the extension control areas.

According to another aspect, the signal generation device arranges the extension control area and other extension control areas in different time/frequency domains within the subframe.

According to another aspect, wherein the extension control area assigns resource blocks in a first half of the radio frame, and another extension control area assigns resource blocks in a second portion of the radio frame.

According to another aspect, the device further including an extension control area control unit that sets a mapping period of for extension control areas assigned to respective user equipment based on a plurality of periods.

According to another aspect, wherein the extension control area control unit determines a transmission and reception delay time of a predetermined user equipment based on information received from the predetermined user equipment, and sets a mapping period based on the delay time.

According to another aspect, the device further including an extension control area control unit that changes a mapping pattern of at least one user equipment.

According to another communication device, the device includes a receiver that receives and detects an extension control area in a data area of a subframe of a radio frame transmitted from a base station, wherein said extension control area including a control signal and is set according to a periodic mapping pattern.

According to another aspect, the device further includes a mapping storage unit that stores the periodic mapping pattern of the extension control area.

According to another aspect, the periodic mapping pattern is received by the receiver in advance from a base station, and is specified by a system frame number that represents at least a reference subframe position, a reference number and a mapping period.

According to another aspect, the receiver is configured to receive notification from a base station of a periodic mapping pattern decided by the base station that arranges the extension control area for the communication device.

According to another aspect, the device further includes an uplink signal generating unit that generates a request to a base station to change a mapping pattern for the communication device.

According to another aspect, the signal generation device generates an extension bit for identifying a system frame number and transmits the extension bit to a user equipment.

According to another aspect, the device further includes a counter that counts a system frame number in a radio frame.

According to another aspect, the counter keeps the communication device in a sleep state until a counting result reaches a target frame position.

According to another aspect, the device further includes a reception control unit that causes the communication device to return from a sleep state before a counting result of the counter reaches the target frame position.

According to another aspect, the signal generation device also includes the extension control area in a previous radio frame and a next radio frame having a same system frame number as the radio frame.

According to another aspect, the signal generation device processes the subframe of the radio frame following a mapping pattern differently from a radio frame of a super system frame having a same system frame number as the radio frame.

According to a communication method embodiment, the method includes setting with a processing circuit an extension control area in a data area of a subframe, said setting including setting the extension control area according to a periodic mapping pattern; and transmitting said subframe within a radio frame of a wireless communications signal.

According to one aspect of the method, the method also includes determining whether a subframe following the periodic mapping pattern has been received; receiving a mapping pattern change request; and changing the periodic mapping pattern for a user equipment that transmitted the mapping pattern change request.

According to one aspect of the method, the method also includes inserting a plurality of extension control areas in the subframe that contain schedule information that describes an arrangement of resource blocks within different ranges.

According to another aspect the inserting includes arranging the extension control area and other extension control areas in different time/frequency domains within the subframe.

According to another aspect, the extension control area assigns resource blocks in a first half of the radio frame, and another extension control area assigns resource blocks in a second portion of the radio frame.

According to a communication system embodiment, the system includes a base station including a signal generation device that generates a wireless communcations signal that includes a subframe within a radio frame, wherein said subframe includes an extension control area in a data area of said subframe and said extension control area is set according to a periodic mapping pattern; and a communication device having a receiver that receives and detects the extension control area set in the data area of the subframe transmitted from the base station.

According to an aspect of the system, said extension control area is one of a plurality of extension control areas contained in the subframe, and said signal generation device includes schedule information that describes an arrangement of resource blocks within different ranges into each of the extension control areas.

According to another aspect of the system, said signal generation device arranges the extension control area and other extension control areas in different time/frequency domains within the subframe.

According to another communication method embodiment, the method includes receiving with a receiver a wireless signal transmitted from a base station, said wireless signal including an extension control area set in a data area of a subframe of a radio frame of said wireless signal, wherein said extension control area including a control signal.

According to one aspect of the method, the method also includes storing a periodic mapping pattern of the extension control area in a mapping storage unit.

According to one aspect of the method, the method also includes receiving the periodic mapping pattern in advance from a base station, said period mapping pattern is specified by a system frame number that represents at least a reference subframe position, a reference number and a mapping period.

According to one aspect of the method, the method also includes receiving notification from a base station of a periodic mapping pattern decided by the base station that arranges the extension control area addressed to a communication device.

According to one aspect of the method, the method also includes generating a request to a base station to change a mapping pattern for the communication device.

According to one aspect of the method, the method also includes counting with a counter a system frame number in a radio frame.

According to another aspect, the communication device is kept in a sleep state until a counting result reaches a target frame position.

According to one aspect of the method, the method also includes estimating a timing error and setting a sleep state; and counting a system frame number for a predetermined count that includes the error estimated in the estimating step.

According to one aspect of the method, the method also includes returning to a reception state after the counting has reached the threshold.

The invention claimed is:

1. A communication device comprising:
circuitry configured to:
generate wireless communications signals that include a plurality of system frames, each of the plurality of system frames including a plurality of subframes, at least some subframes of said plurality of subframes including an extension control area in a data area thereof respectively, and said extension control area being set according to a periodic mapping pattern with a predetermined interval; and
generate an extension bit for identifying a specific system frame of said plurality of system frames, the specific system frame including a subframe of said some subframes including the extension control area, wherein
the predetermined interval is longer than a length of a super system frame period including a plurality of said system frames.

2. The communication device of claim 1, wherein
said extension control area is one of a plurality of extension control areas contained in the subframe, and
said circuitry includes schedule information that describes an arrangement of resource blocks within different ranges into each of the extension control areas.

3. The communication device of claim 1, wherein said circuitry arranges the extension control area and other extension control areas in different time/frequency domains within the subframe.

4. The communication device of claim 1, wherein the extension control area assigns resource blocks in a first half of the system frame in the super system frame period.

5. The communication device of claim 1, wherein the circuitry sets a mapping period of for extension control areas assigned to respective user equipment based on a plurality of periods.

6. The communication device of claim 5, wherein the circuitry determines a transmission and reception delay time of a predetermined user equipment based on information received from the predetermined user equipment, and sets the predetermined interval based on the delay time.

7. The communication device of claim 1, wherein the circuitry changes the periodic mapping pattern of at least one user equipment.

8. The communication device of claim 1, wherein the extension bit identifies a system frame number of the plurality of system frames and transmits the extension bit to a user equipment.

9. A communication device comprising:
   circuitry configured to:
   receive wireless communications signals from a base station, the wireless communications signals including a plurality of system frames, each of the plurality of system frames including a plurality of subframes, at least some subframes of said plurality of subframes including an extension control area in a data area thereof respectively, said extension control area including a control signal, said extension control area being set according to a periodic mapping pattern with a predetermined interval, the predetermined interval being longer than a length of a super system frame period including a plurality of said system frames, and the wireless communications signals including an extension bit for identifying a specific system frame of said plurality of system frames, the specific system frame including a subframe of said some subframes including the extension control area; and
   detect the extension control area in accordance with the period c mapping pattern using the extension bit.

10. The communication device of claim 9, wherein the circuitry stores information on the periodic mapping pattern of the extension control area.

11. The communication device of claim 10, wherein the information on the periodic mapping pattern is received by the circuitry in advance from the base station, and is specified by a system frame number that represents at east a reference subframe position, a reference number and the predetermined interval.

12. The communication device of claim 9, wherein the circuitry is configured to receive notification from the base station of the periodic mapping pattern decided by the base station that arranges the extension control area for the communication device.

13. The communication device of claim 9, wherein the circuitry generates a request to the base station to change the periodic mapping pattern for the communication device.

14. The communication device of claim 9, wherein the circuitry counts the system frame number of the plurality of system frames.

15. The communication device of claim 14, wherein the circuitry keeps the communication device in a sleep state until a counting result reaches a target frame position.

16. The communication device of claim 14, wherein the circuitry causes the communication device to return from a sleep state before a counting result of the circuitry reaches a target frame position.

17. A communication method comprising:
   generating, using circuitry, wireless communications signals that include a plurality of system frames, each of the plurality of system frames including a plurality of subframes, at least some subframes of said plurality of subframes including an extension control area in a data area thereof respectively, and said extension control area being set according to a periodic mapping pattern with a predetermined interval;
   generate, using the circuitry, an extension bit for identifying a specific system frame of said plurality of system frames, the specific system frame including a subframe of said some subframes including the extension control area; and
   transmitting said wireless communications signals, wherein
   the predetermined interval is longer than a length of a super system frame period including a plurality of said system frames.

18. A communication system comprising:
   a base station including:
      first circuitry configured to:
      generate wireless communications signals that include a plurality of system frames, each of the plurality of system frames including a plurality of subframes, at least some subframes of said plurality of subframes including an extension control area in a data area thereof respectively, and said extension control area being set according to a periodic mapping pattern with a predetermined interval; and
      generate an extension bit for identifying a specific system frame of said plurality of system frames, the specific system frame including a subframe of said some subframes including the extension control area, wherein
      the predetermined interval is longer than a length of a super system frame period including a plurality of said system frames; and
   a communication device including:
      second circuitry configured to:
      receive the wireless communications signals from the base station; and
      detect the extension control area in accordance with the periodic mapping pattern using the extension bit.

19. A communication method comprising:
   receiving, using circuitry, wireless communications signals from a base station, the wireless communications signals including a plurality of system frames, each of the plurality of system frames including a plurality of subframes, at least some subframes of said plurality of subframes including an extension control area in a data area thereof respectively, said extension control area including a control signal, said extension control area being set according to aperiodic mapping pattern with a predetermined interval, the predetermined interval being longer than a length of a super system frame period including a plurality of said system frames, and the wireless communications signals including an extension bit for identifying a specific system frame of said plurality of system frames, the specific system frame including a subframe of said some subframes including the extension control area; and
   detect, using the circuitry, the extension control area in accordance with the periodic mapping pattern using the extension bit.

* * * * *